United States Patent [19]
Schwan et al.

[11] Patent Number: 6,052,743
[45] Date of Patent: Apr. 18, 2000

[54] BUFFER OBJECT FOR PERFORMING BUFFERED DATA TRANSFERS IN A DATA ACQUISITION SYSTEM

[75] Inventors: Brent C. Schwan; Kyle Evans, both of Austin, Tex.

[73] Assignee: National Instruments Corporation, Austin, Tex.

[21] Appl. No.: 08/968,221

[22] Filed: Nov. 12, 1997

[51] Int. Cl.⁷ .................................................. G06F 13/28
[52] U.S. Cl. .................................................................. 710/23
[58] Field of Search ............................. 702/123; 709/104, 709/212; 710/22, 23

[56] References Cited

U.S. PATENT DOCUMENTS 5,247,639  9/1993  Yamahata ................................ 711/138
5,724,272  3/1998  Mitchell et al. ......................... 702/123

*Primary Examiner*—John A. Follansbee
*Attorney, Agent, or Firm*—Conley, Rose & Tayon; Jeffrey C. Hood

[57] ABSTRACT

A buffer object for performing intelligent buffering functions in a data acquisition (DAQ) system. The buffer object stores information regarding data to be transferred and includes one or more iterators for performing burst transfers. When a DAQ user application generates a call to perform data transfer operations in the DAQ system, the driver level software creates or instantiates a buffer object. The buffer object includes data format information specifying a format of the data being transferred, including the size of the data, the number of samples per scan, and number of scans of the data. The driver level software also creates a foreground iterator which is executable to transfer data between a client portion of system memory and a buffer portion of system memory. The driver level software also creates a background iterator which is executable to transfer data between a buffer portion of system memory and the on-board memory comprised on the DAQ device. The foreground iterator and the background iterator execute in response to the DAQ user application to perform data transfers to/from the DAQ device. The foreground and background iterators also use information in the buffer object to perform the data transfer. In the preferred embodiment, the foreground iterator executes in user mode of the CPU, and the background iterator executes in kernel mode of the CPU.

44 Claims, 11 Drawing Sheets

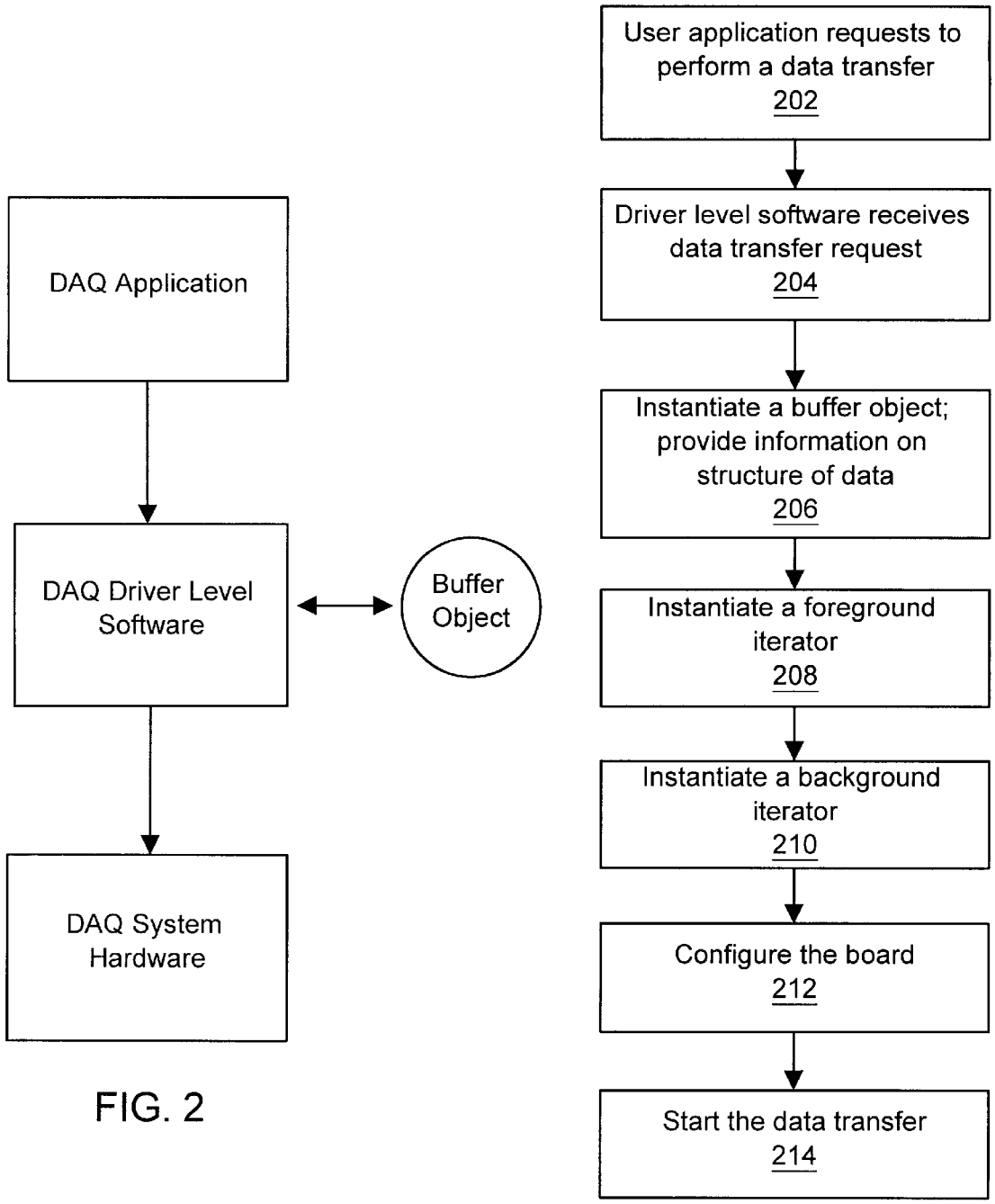

10

BUFFER OBJECT FOR PERFORMING BUFFERED DATA TRANSFERS IN A DATA ACQUISITION SYSTEM

RESERVATION OF COPYRIGHT

A portion of the disclosure of this patent document contains material to which a claim of copyright protection is made. The copyright owner has no objection to the facsimile reproduction by anyone of the patent document or the patent disclosure as it appears in the Patent and Trademark Office patent file or records, but reserves all other rights whatsoever.

FIELD OF THE INVENTION

The present invention relates to data acquisition (DAQ) systems, and particularly to a software buffer object which performs intelligent buffering functions in a data acquisition system.

DESCRIPTION OF THE RELATED ART

Scientists and engineers often use DAQ systems to perform a variety of functions, including laboratory research, process monitoring and control, data logging, analytical chemistry, test and analysis of physical phenomena, and control of mechanical or electrical machinery, to name a few examples.

A typical DAQ system comprises a computer system with DAQ hardware, wherein the DAQ hardware is typically plugged into one of the I/O slots of the computer system. A DAQ system also typically includes transducers and other detecting means for providing "field" electrical signals representing a process, physical phenomena, equipment being monitored or measured, etc. The field signals are provided to the DAQ hardware. In another common DAQ system configuration, the DAQ hardware is coupled to the computer system via other means such as through a VXI (VME eXtensions for Instrumentation) bus, a GPIB (General Purpose Interface Bus), a serial port, or parallel port of the computer system. Optionally, the DAQ system includes signal conditioning modules which receive the field signals and condition the signals to be acquired.

The DAQ hardware is configured and controlled by DAQ software executing on the computer system. The DAQ software for configuring and controlling the DAQ system typically comprises two portions: the device interface or driver level software and the application software, or the application. The driver level software serves to interface the DAQ hardware to the application. The driver level software is typically supplied by the manufacturer of the DAQ hardware or by some other third party software vendor. An example of DAQ driver level software is NI-DAQ from National Instruments Corporation. The application or client is typically developed by the user of the DAQ system and is tailored to the particular function which the user intends the DAQ system to perform. The DAQ hardware manufacturer or third party software vendor sometimes supplies the application software for certain applications which are common, generic or straightforward.

Data acquisition systems typically perform buffered acquisitions, wherein received data is first stored in a buffer on the DAQ board before being provided to the computer system memory. In general, for data transfers to or from a device in a computer system, the data transfers can occur either using DMA techniques or using programmed I/O, e.g., such as ISRs.

In prior art systems, developers creating applications to transfer data to/from a device in the computer system were required to spend a fairly large amount of time developing code to set up different types of transfers as well as handling various conditions. Thus, code was required to be developed to detect and handle overwrites and over-reads of data, wrapping of buffers, time-outs, burst calculations, and data formatting such as scaling and sequencing. This effort was required to be duplicated every time a new type of transfer was performed, and the user was required to re-create this code for each application.

It would be highly desirable to provide improved buffering services in a data acquisition system. It would further be desirable to provide a modular form of buffering functionality which is usable by a plurality of clients. Therefore, an improved system and method is desired for enabling software developers to efficiently perform buffered transfer functions with greater code reuse.

SUMMARY OF THE INVENTION

The present invention comprises a buffer object for performing intelligent buffering functions in a data acquisition (DAQ) system. Broadly speaking, the data acquisition system comprises a computer system coupled to a data acquisition device. The data acquisition device is operable to generate/receive data and includes on-board memory. A data acquisition application (user application or client) executes on the computer system, and driver level or device interface software executes on the computer system which enables the data acquisition application to control the data acquisition device. In addition, a buffer object according to the present invention executes in the computer system which performs intelligent buffering functions. The buffer object stores information regarding data to be transferred and includes one or more iterators for performing burst transfers. In one embodiment, the buffer object is used for transfers between two or more computer systems.

When a DAQ user application generates a call to perform data transfer operations in the DAQ system, the driver level software creates or instantiates a buffer object. The buffer object includes data format information specifying a format of the data being transferred, including the size of the data, the number of samples per scan, and number of scans of the data.

The driver level software also creates a foreground iterator which is executable to transfer data between a client portion of system memory and a buffer portion of system memory. The driver level software also creates a background iterator which is executable to transfer data between a buffer portion of system memory and the on-board memory comprised on the DAQ device. The foreground iterator and the background iterator execute in response to the DAQ user application to perform data transfers to/from the DAQ device. The foreground and background iterators also use information in the buffer object to perform the data transfer. In the preferred embodiment, the foreground iterator executes in user mode of the CPU, and the background iterator executes in kernel mode of the CPU.

When a data acquisition is being performed, the DAQ device generates an interrupt when the memory on the DAQ device comprises a specified amount of data. The interrupt invokes an interrupt service routine (ISR), which executes to direct the background iterator to transfer data from the on-board memory comprised on the DAQ device to the buffer portion of system memory. When a data generation is being performed, the DAQ device generates an interrupt when the memory on the DAQ device is available to receive a specified amount of data. The interrupt invokes an interrupt service routine (ISR), which executes to direct the background iterator to transfer data from the buffer portion of system memory to the on-board memory comprised on the DAQ device.

During execution of the foreground and background iterators, each respective iterator preferably calculates a maximum continuous burst length for the burst data transfer, determines if the burst data transfer having the maximum continuous burst length will overwrite the other iterator, and shortens the burst length if the iterator determines that the burst data transfer having the maximum burst length will overwrite the other iterator. Each iterator also determines if the burst data transfer having the maximum continuous burst length will wrap around in the buffer and shortens the burst length accordingly. Each iterator also determines if the burst data transfer includes a non-contiguous break and shortens the burst length to the end of a contiguous block if the burst data transfer includes a non-contiguous break. Also, after each burst transfer, each iterator updates a position of the data in the buffer portion of system memory.

An iterator may comprise a sequence iterator, wherein the sequence iterator is executable to perform non-contiguous data transfers. An iterator may also comprise a scaling iterator which performs scaling on the data on the fly as data is transferred to/from the buffer object. An iterator may also comprise a messaging iterator which checks for predetermined conditions in the data and provides a message to the system if the pre-determined conditions are observed.

The background iterator may also receive a time-out value, wherein the background iterator repeatedly performs data transfers during the time-out period and discontinues data transfers when the time-out period has expired. In one embodiment, the background iterator examines the buffer portion of system memory to determine if data is available for transfer, and the background iterator enters a sleep mode if the background iterator determines that data is not available for transfer. The background iterator is awakened from the sleep mode by an event, such as the time-out expiring or the foreground iterator transferring data to the buffer portion of system memory.

Therefore, the present invention comprises a modular and reusable buffer object and associated iterators for performing buffered transfers in a system, such as a DAQ system. The buffer object and associated iterators encapsulate intelligent buffer transfer functions in a modular and reusable form, thus simplifying development of DAQ applications.

BRIEF DESCRIPTION OF THE DRAWINGS

A better understanding of the present invention can be obtained when the following detailed description of the preferred embodiment is considered in conjunction with the following drawings, in which:

FIG. 2 illustrates the software/hardware hierarchy of the DAQ system of FIG. 1, including the buffer object of the present invention;

FIG. 3 is a flowchart diagram illustrating operations when a data transfer is requested;

DETAILED DESCRIPTION OF THE PREFERRED EMBODIMENT

INCORPORATION BY REFERENCE

U.S. patent application Ser. No. 08/943,784 titled "Configuration Manager for Configuring a Data Acquisition System" filed Oct. 3, 1997, whose inventors are Meg Fletcher Kay, Jonathan Brumley, Howard Tsoi, and Kurt Carlson, is hereby incorporated by reference as though fully and completely set forth herein.

U.S. patent application Ser. No. 08/711,128 titled "Attribute-Based System and Method for Configuring and Controlling a Data Acquisition Task" filed Sep. 9, 1996, whose inventors are Tim Hayles and James Bednar, is hereby incorporated by reference as though fully and completely set forth herein.

U.S. patent application Ser. No. 08/946,804 titled "Mini-Driver Software Architecture for a Data Acquisition System" filed Oct. 8, 1997, now U.S. Pat. No. 5,926,775, whose inventors are Jonathan Brumley and Neil Feiereisel, is hereby incorporated by reference as though fully and completely set forth herein.

U.S. patent application Ser. No. 08/630,387 titled "Data Acquisition System and Method for Performing I/O Management Functions on a Plurality of Hardware Platforms and/or in a Plurality of Privilege Modes" filed Apr. 10,1996, now U.S. Pat. No. 5,925,109 whose inventor is Christopher T. Bartz, is hereby incorporated by reference as though fully and completely set forth herein.

FIG. 1—DAQ System

Figure 1:
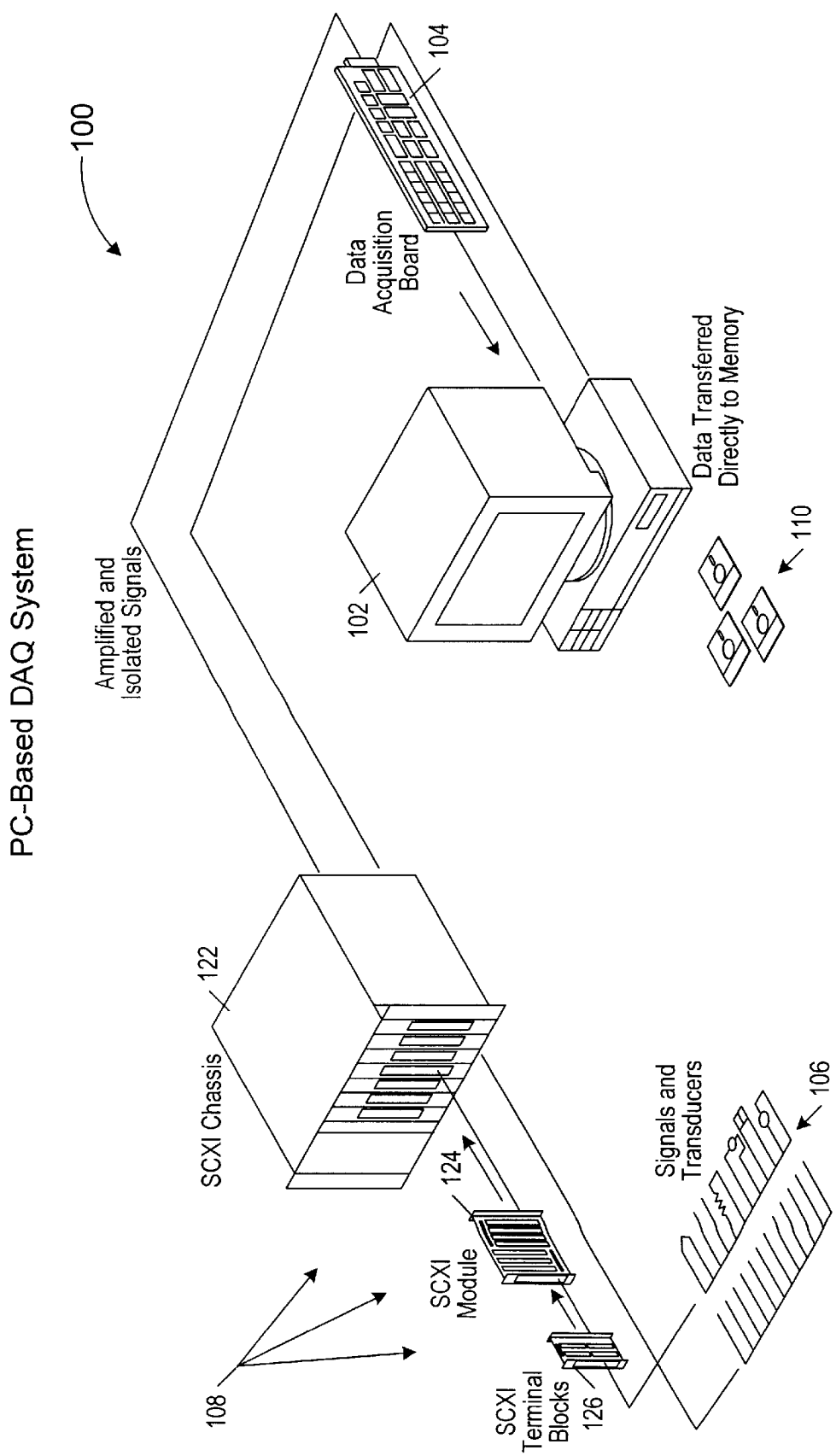
FIG. 1 illustrates a DAQ system according to the present invention.

Referring now to FIG. 1, an illustrative DAQ system 100 according to the present invention is shown. The system 100 comprises a computer 102, a DAQ device or board 104 coupled to the computer 102, and transducers 106 or other detecting means which provide field electrical signals to the DAQ device 104, optionally through signal conditioning circuitry 108. The computer 18 includes various standard components, including at least one central processing unit (CPU), non-volatile memory, such as a hard drive, system memory, one or more buses, and a power supply.

The computer 102 preferably includes a memory media, such as a magnetic media, e.g., floppy disk(s) 110, or a CD-ROM, on which computer programs according to the present invention are stored. The software programs of the present invention are also stored in the system memory and/or hard drive of the computer 102 and executed by the CPU. The CPU executing code and data from the memory thus comprises a means for configuring and controlling the DAQ device 104 to acquire/generate data from/to the field signals according to the steps described below. In the present disclosure, the terms "memory" or "memory media" are intended to include various types of memory, including installation media such as a CD-ROM, floppy disks 110, or tape drive disks, computer system memory such as DRAM, SRAM, etc., and non-volatile memory such as a hard drive or optical storage.

In one embodiment, the computer 102 comprises input/output (I/O) slots into which the DAQ device 104 is coupled. In another embodiment, the computer 102 comprises a VXI (VME Extensions for Instrumentation) chassis and bus, a GPIB (General Purpose Interface Bus), a serial port or parallel port by which the DAQ device 104 is coupled to the computer 102. Examples of computer 102 are IBM-compatible personal computers, Apple Macintosh computers, and Sun Microsystems workstations and operating systems which execute on them.

In one embodiment, the transducers 106 are coupled directly to the DAQ device 104. In another embodiment, the signals received by the transducers 106 are conditioned by the signal conditioning circuitry 108 for presentation to the DAQ device 104 as shown. An example of signal conditioning circuitry 108 is Signal Conditioning Extensions for Instrumentation (SCXI) circuitry. SCXI is an open architecture, multi-channel signal conditioning front-end system for DAQ devices. SCXI comprises an external chassis 122 housing signal conditioning modules 124 and optionally terminal blocks 126 for amplifying, multiplexing, and isolating field signals. The signal conditioning modules advantageously reduce the introduction of noise into the signals transmitted to the DAQ device 104. The term "data acquisition" used in this specification is intended to encompass data generation as well as data acquisition, particularly as applied to instrumentation and process control systems.

The transducers 106 and other detecting means provide the field signals representing a process, physical phenomena, equipment being monitored or measured, etc. to the DAQ device 104. Examples of the transducers 106 are strain gauges, thermocouples, thermistors, photoconductive cells, microphones, and piezoelectric transducers, among others.

The DAQ device 104 is configured to acquire or generate signals of various I/O types. In particular, the I/O types comprise analog input signals, analog output signals, digital input signals, digital output signals and counter/timer inputs and outputs. The analog input and output signals are received and generated, respectively, on analog "channels" of the DAQ device 104. The digital input and output signals are received and generated, respectively, on digital I/O "ports" of the DAQ device 104. Each channel, port or counter has an associated number which uniquely identifies it with respect to the DAQ device 104 on which it resides.

Examples of DAQ device 104 are the following products available from National Instruments Corporation: E Series Multifunction I/O boards, such as the AT-MIO-16 series analog input boards, the AT-AO-6/10 series analog output boards, the PC-DIO-96 digital I/O board, the PC-TIO10 counter/timer I/O board. Examples of the SCXI circuitry 108 are the following products available from National Instruments Corporation: SCXI-1000 4-slot chassis, the SCXI-1100 32-channel multiplexer amplifier module, and SCXI-1160 16-channel power relay module.

Figure 1A:
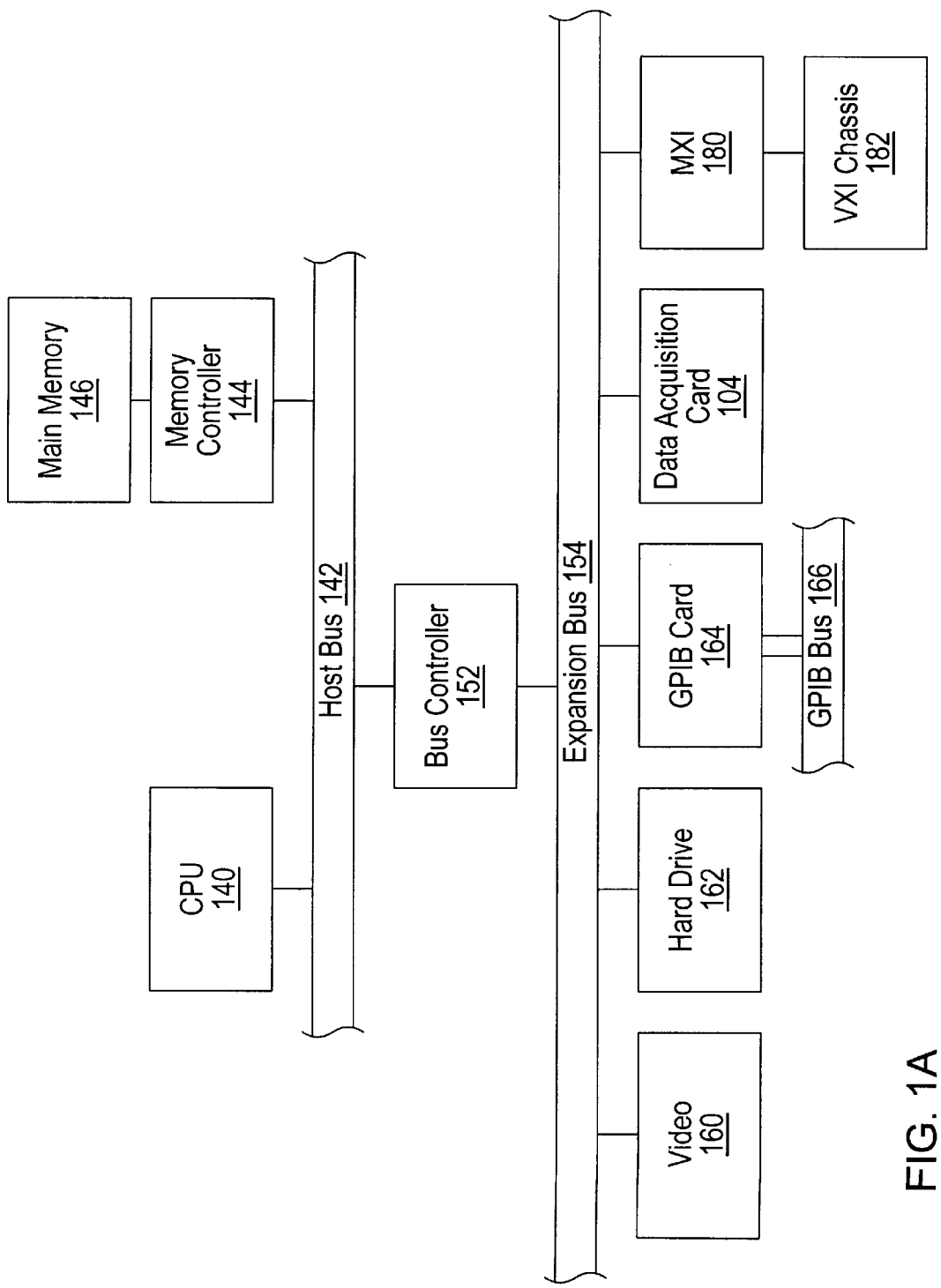
FIG. 1A is a block diagram of the computer system of FIG. 1.

FIG. 1A—Computer Block Diagram

FIG. 1A illustrates a block diagram of the computer system 102. It is noted that the computer system 102 may have various different architectures, as desired. The elements of a computer system not necessary to understand the operation of the present invention have been omitted for simplicity.

The computer system 102 includes a central processing unit or CPU 140 which is coupled to a processor or host bus 142. The CPU 140 may be any of various types, including an Intel x86 processor such as the Pentium class from Intel, a PowerPC CPU from the Motorola family of processors, as well as others.

Main memory 146, also referred to as system memory 146, is coupled to the host bus 142 by means of memory controller 144. The system memory 146 stores various software used in the DAQ system 100, including DAQ driver level software according to the present invention. The DAQ driver level software is preferably NI-DAQ from National Instruments. The system memory 146 also stores a DAQ user application, such as LabVIEW, LabWindows CVI, BridgeVIEW, ComponentWorks, the DAQ Channel Wizard, etc. The system memory 146 also stores a buffer object and one or more iterators according to the present invention. The system memory 146 may store other DAQ related software, as desired.

Host bus 142 is coupled to an expansion or input/output bus 154 by means of a bus controller 152. The expansion bus 154 is preferably the PCI (Peripheral Component Interconnect) bus, and the bus controller 152 is preferably chipset logic, available from Intel Corporation. The expansion bus 154 includes slots for various devices, including video 160. A non-volatile memory or hard drive 162 is comprised in the computer system 102 and may be coupled to the expansion bus 154 or to the chipset 152, or to other logic. The non-volatile memory 162 stores an operating system, DAQ software, as well as other application programs, for loading into the system memory 146 as known in the art.

Data acquisition card 104 is connected to the expansion bus 154. The data acquisition card 104 receives analog (or digital) signals from an external sensor or instrument and in turn produces digital data that is provided to the CPU 140 and/or the system memory 146. The DAQ card 104 may also generate signals to the sensors. The DAQ card 104 is controlled by the DAQ driver level software and the DAQ user application executing in the system memory 146. As discussed below, the buffer objects and iterators of the present invention operate to transfer data to/from the DAQ card 104.

The computer system 102 may also include a GPIB (General Purpose Interface Bus) card 164 that interfaces to one or more instruments via the GPIB bus 166, and may include a MXI card 180 that connects to a VXI chassis 182.

FIG. 2—DAQ Software Block Diagram

Referring now to FIG. 2, a block diagram illustrating the relationship of portions of the DAQ system 100 (FIG. 1) is shown. DAQ application software interfaces with DAQ driver level software according to the present invention to configure and control the DAQ device 104 (FIG. 1).

The DAQ application provides an interface to the user of the DAQ system. The user receives output via output devices of the computer 102, such as a display screen, and provides input via input devices such as a mouse or keyboard of the computer 102 (of FIG. 2) to direct the acquisition or generation of field signal data. In addition, the DAQ application calls functions of or invokes objects in the DAQ driver level software to configure the attributes of the DAQ device 104, DAQ system 100, or a DAQ task to control the acquisition or generation of field signal data by the system 100.

The DAQ driver level software provides a means for the DAQ application to interface to the DAQ device 104. The DAQ driver level software comprises device drivers for communicating with the DAQ device 104. The device drivers perform input/output operations to registers on the DAQ device 104 to configure and control the DAQ device 104. The device drivers also service interrupts from the DAQ device 104. According to the present invention, the DAQ driver level software uses the services of the buffer object to perform memory transfers to shared memory on the DAQ device 104. The DAQ driver level software uses the services of an object referred to as the DMA object to perform direct memory access (DMA) data transfers from or to the DAQ device 104 when appropriate. Further, the device drivers interact with the operating system executing on the computer 102 to perform such operations as allocating memory for the DAQ application 32 and device interface software itself. The device drivers execute at the required privilege level to perform the aforementioned operations.

In one embodiment, the DAQ driver level software comprises a modular architecture for improved performance. For more information on this modular DAQ driver level software architecture, please see related co-pending application Ser. No. 08/946,804 titled "Mini-Driver Software Architecture for a Data Acquisition System" filed Oct. 8, 1997, (Docket 5150-22300) whose inventors are Jonathan Brumley and Neil Feiereisel, and which was incorporated by reference above.

As shown, the DAQ driver level software is executable to instantiate a buffer object according to the present invention for performing intelligent buffering functions. As discussed further below, the DAQ driver level software is also executable to instantiate or create one or more iterators, such as foreground and background iterators, for performing buffered transfers.

FIG. 3—Flowchart Diagram

FIG. 3 is a flowchart diagram which illustrates instantiation of a buffer object and foreground and background iterators for performing a buffered transfer according to the preferred embodiment.

As shown, in step 202 the user application or client requests to perform a data transfer. This involves the DAQ user application, also referred to as the client, making a call to the DAQ driver level software to perform a data transfer. The data transfer may be a data acquisition wherein the DAQ device 104 receives data for storage in the computer system, or may comprise generation of data such as generating a pattern for a desired test and measurement.

In step 204 the DAQ driver level software receives the data transfer request, i.e., receives the call made by the user application in step 202.

In step 206 the driver level software instantiates a buffer object. In the preferred embodiment, the driver level software instantiates a buffer object from a buffer class. The driver level software provides information on the structure or format of the data to the buffer object. Thus, the buffer object stores data format information comprising the format of the data being transferred. The data format information comprises information regarding size of the data, the number of samples per scan, and the number of scans of the data, i.e., the total amount of data being acquired or generated.

In step 208 the driver level software instantiates a foreground iterator. The foreground iterator is designed for execution in user mode of the CPU and is executable to transfer data between a client portion of system memory and a buffer object portion of system memory. The foreground iterator operates to iterate between one or more burst data transfers which transfer data between the client portion of system memory and the buffer object portion of system memory. In the case of a data acquisition, the foreground iterator is a read iterator operating to read data from the buffer object portion of the system memory to the client portion of system memory. In the case of a data generation, the foreground iterator is a write iterator which operates to write data from the client portion of system memory to the buffer object portion of system memory.

In step 210 the driver level software instantiates a background iterator. The background iterator is designed for execution in kernel mode of the CPU. The background iterator is executable to transfer data between the buffer object portion of the system memory and the on-board memory on the DAQ device 104. In the case of a data acquisition, the background iterator is a write iterator operating to write data from the on-board memory of the DAQ device to the buffer object portion of the system memory. In the case of a data generation, the background iterator is a read iterator which operates to read data from the buffer object portion of system memory and supply the data to the on-board memory on the DAQ device 104 for generation.

In step 212 the driver level software configures or programs the DAQ device or DAQ board 104 for the data transfer, i.e., the acquisition or generation. This involves the driver level software programming one or more registers on the DAQ board 104 to configure the board for the desired transfer. It is noted that step 212 can occur any time before, during or after the buffer object and iterators are instantiated.

In step 214 the driver level software starts the data transfer.

Figure 4:
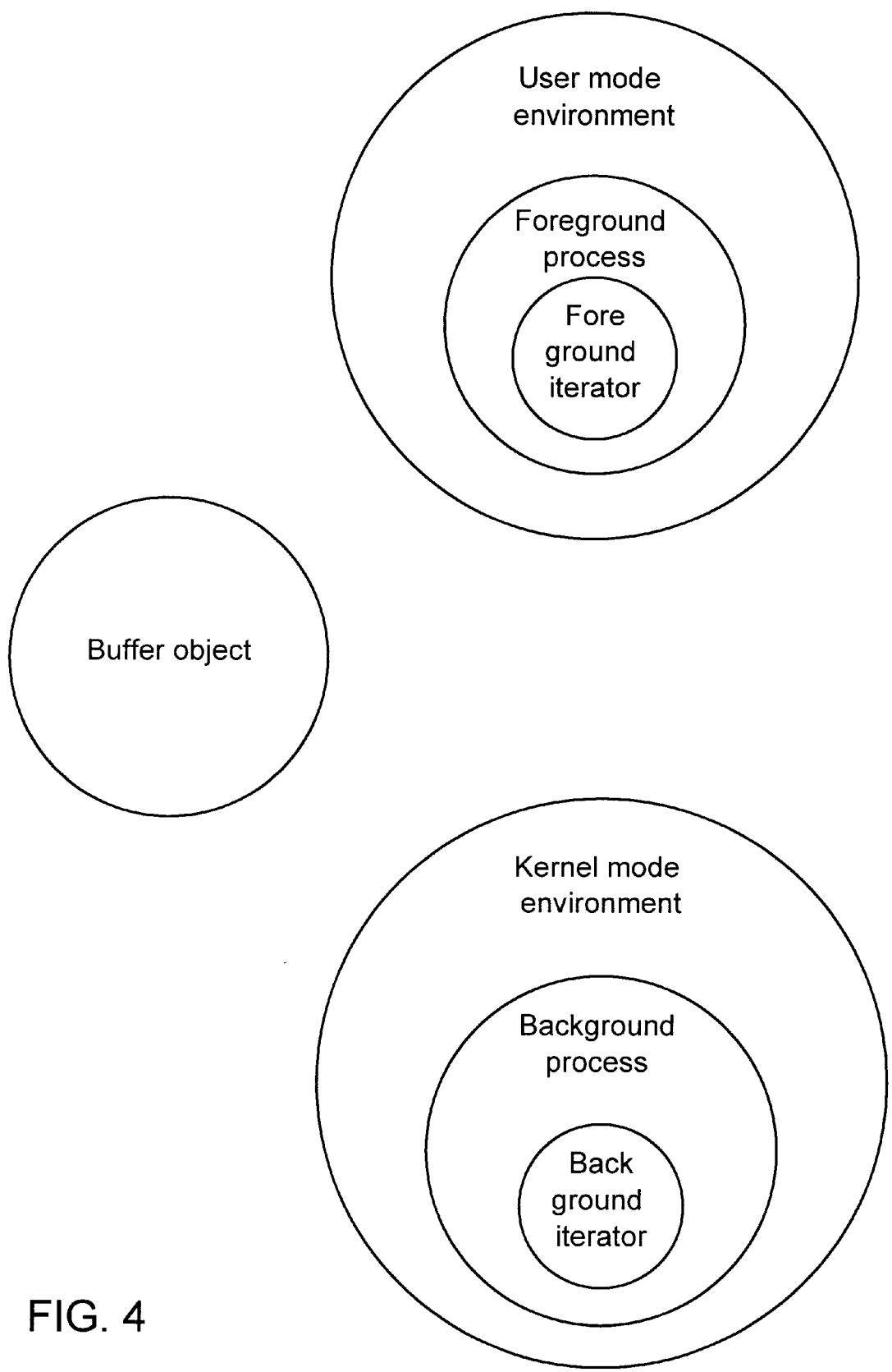
FIG. 4 illustrates the buffer object, and foreground and background iterators created in the flowchart of FIG. 3.

FIG. 4—Instantiated Objects

FIG. 4 illustrates the objects instantiated in the flowchart of FIG. 3. As shown, the client and/or the driver level software instantiates a buffer object. As noted above, the buffer object includes data format information describing the data format of the data being transferred. In the preferred embodiment, the buffer object also includes a buffer portion in system memory which is used as a temporary buffer for data being transferred to/from the DAQ board 104 and data being transferred to/from the client portion of system memory.

The client and/or the driver level software also instantiates a foreground iterator. As shown, the foreground iterator executes in a foreground process in user mode of the CPU. As noted above, the foreground iterator operates to transfer data between the client portion of system memory and the buffer portion of system memory.

The client and/or the driver level software also instantiates a background iterator. As shown, the background iterator executes in a background process in kernel mode of the CPU. As noted above, the background iterator operates to transfer data between the buffer portion of system memory and the on-board memory on the DAQ device 104.

Figure 5:
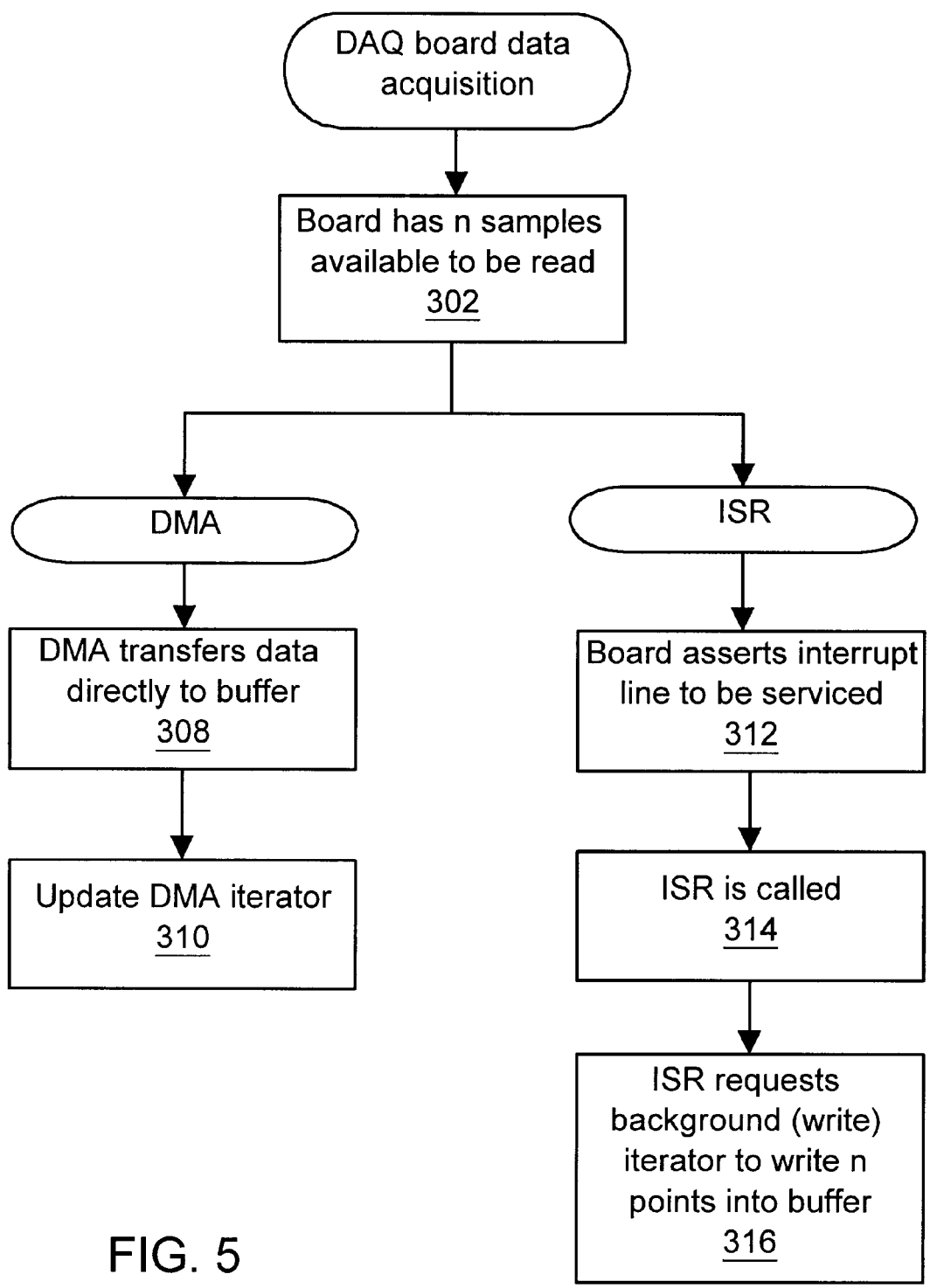
FIG. 5 is a flowchart illustrating a DAQ board acquisition or read using the buffer object of the present invention.

FIG. 5—Flowchart Diagram: Data Acquisition

FIG. 5 is a flowchart diagram illustrating operation of a data acquisition according to the present invention. More specifically, FIG. 5 illustrates operation of a data acquisition by the DAQ board 104, involving a write transfer from the DAQ board 104 to the buffer object portion of shared memory. Thus the steps in the flowchart of FIG. 5 occur after the data transfer is started in step 214 of FIG. 3.

The flowchart of FIG. 5 presumes that the steps performed in the flowchart of FIG. 3 were performed and operated to configure the DAQ board 104 for a read operation, i.e., analog or digital input to the DAQ board 104. Thus, it is presumed that, in the flowchart of FIG. 3, the DAQ driver level software operated to instantiate the buffer object in step 206 as well as foreground and background iterators in steps 208 and 210. Also, the DAQ driver level software operated to configure the DAQ board 104 in step 212 for a read or acquisition. In step 214 the data transfer was started, wherein the DAQ board 104 began acquiring data. In the case of a data acquisition, the background iterator is a write iterator, and the foreground iterator is a read iterator.

After the data transfer has been started, when the DAQ board 104 has acquired a sufficient amount of data, e.g., the FIFO has acquired N samples or has become full, the DAQ board 104 generates a request or an interrupt. As shown, in step 302 it is presumed that the board has acquired a sufficient number of samples, e.g., N samples, available to be read, and this is the event which causes the request or interrupt to be generated.

When the DAQ board 104 has acquired N samples which are available in step 302, then the board requests service. If DMA capabilities are available in the DAQ system, then the board 104 generates a DMA request to request a DMA transfer. In this case, in step 308 DMA operations are used to transfer data from the DAQ device 104 directly to the buffer object portion of system memory. In the preferred embodiment, a request is made to a DMA object, and the DMA object operates to perform the DMA transfers, preferably using a DMA iterator.

Also, if DMA capabilities are available, then preferably DMA operations are used, instead of the foreground iterator, to transfer data from the buffer object portion of system memory to the client portion of system memory. In step 310, the DMA object updates the DMA iterator after the DMA transfer, and operation completes.

If the DAQ board 104 and/or the computer system 102 do not support DMA capabilities, then in step 312 the DAQ board 104 generates an interrupt. In this case, in step 312 the DAQ board 104 asserts an interrupt line to be serviced. As well known in the art, the interrupt is provided to the CPU, which executes an interrupt service routine (ISR) in response to the interrupt.

In step 314 the ISR is invoked in response to the interrupt. In step 316 the ISR executes and requests the background iterator, which in this case is a write iterator, to write N points from the on-board memory on the DAQ device into the buffer object in system memory. The write iterator thus operates to transfer data from the hardware FIFO on the DAQ device 104 into the buffer object shared memory portion in system memory. The background iterator preferably formats the data and then transfers the data. In the preferred embodiment, the background iterator accesses the data format information in the buffer object to properly format the data prior to the transfer.

As the data is transferred from the memory on the DAQ board 104 to the buffer object shared memory in the system memory, the buffer object becomes more full and will wrap around as the data transfer continues. Meanwhile, in the foreground whenever the ISR is not running, the driver level software preferably directs the foreground iterator to transfer the data from the shared memory in the buffer object to a system memory area useable by the client application. Thus, while the background iterator is transferring data from the on-board memory to the buffer object portion of system memory, the foreground iterator retrieves data from the buffer object portion of system memory and provides the data to a client portion of system memory. Thus the background and foreground iterators operate in tandem to accomplish the transfer.

During the transfer, the client application is preferably waiting on an event, i.e., waiting for the data to be transferred from the buffer object in system memory to the client portion of system memory. For example, if the client desired to read 1,000 points with a 10 second delay or 10 second time out, the foreground iterator would attempt to read out 1,000 points within 10 seconds. More specifically, the foreground iterator would attempt to transfer 1000 points from the buffer object in system memory to the client portion of system memory.

The foreground iterator determines how much of the buffer has been filled up by the background iterator, and the foreground iterator attempts to stay just behind the background iterator moving data into the user's buffer. In other words, the foreground iterator attempts to move data out of the buffer object shared memory as soon as the data arrives. Thus whenever the foreground iterator is invoked and notices that new data is present in the buffer, the foreground iterator moves the data into the client's foreground buffer. The client buffer is a portion of system memory reserved for the client or user application. For example, the client could be LabVIEW which operates to display the acquired data in a diagram or chart.

Thus one iterator attempts to keep up with the other iterator. When a time out occurs, one iterator stops transferring data and notifies the other iterator of an error. The operation of read and write iterators is discussed further below with respect to FIG. 8.

FIG. 5 thus illustrates a transfer involving the buffer object and the iterators in the case of a data acquisition by the DAQ board 104. In summary, when the client requests a data transfer, this causes the DAQ driver level software to instantiate the buffer object and the iterator objects. After the buffer object and the iterator objects are instantiated and configured, then the data transfer may be initiated. In the preferred embodiment, when the DAQ board has received a sufficient amount of data, e.g., N samples have been received or the FIFO is full, the DAQ board requests a transfer. If DMA capabilities are present, then the board requests a DMA transfer, and DMA transfers are performed, preferably using a DMA object. If DMA capabilities are not available, the board 104 generates an interrupt. The interrupt causes an interrupt service routine to be generated, which initiates the data transfer. The ISR uses the services of a background iterator to accomplish the transfer from the DAQ board memory to a buffer portion in system memory. A foreground iterator also executes to transfer data from the buffer portion in system memory to the client portion of system memory.

Figure 6:
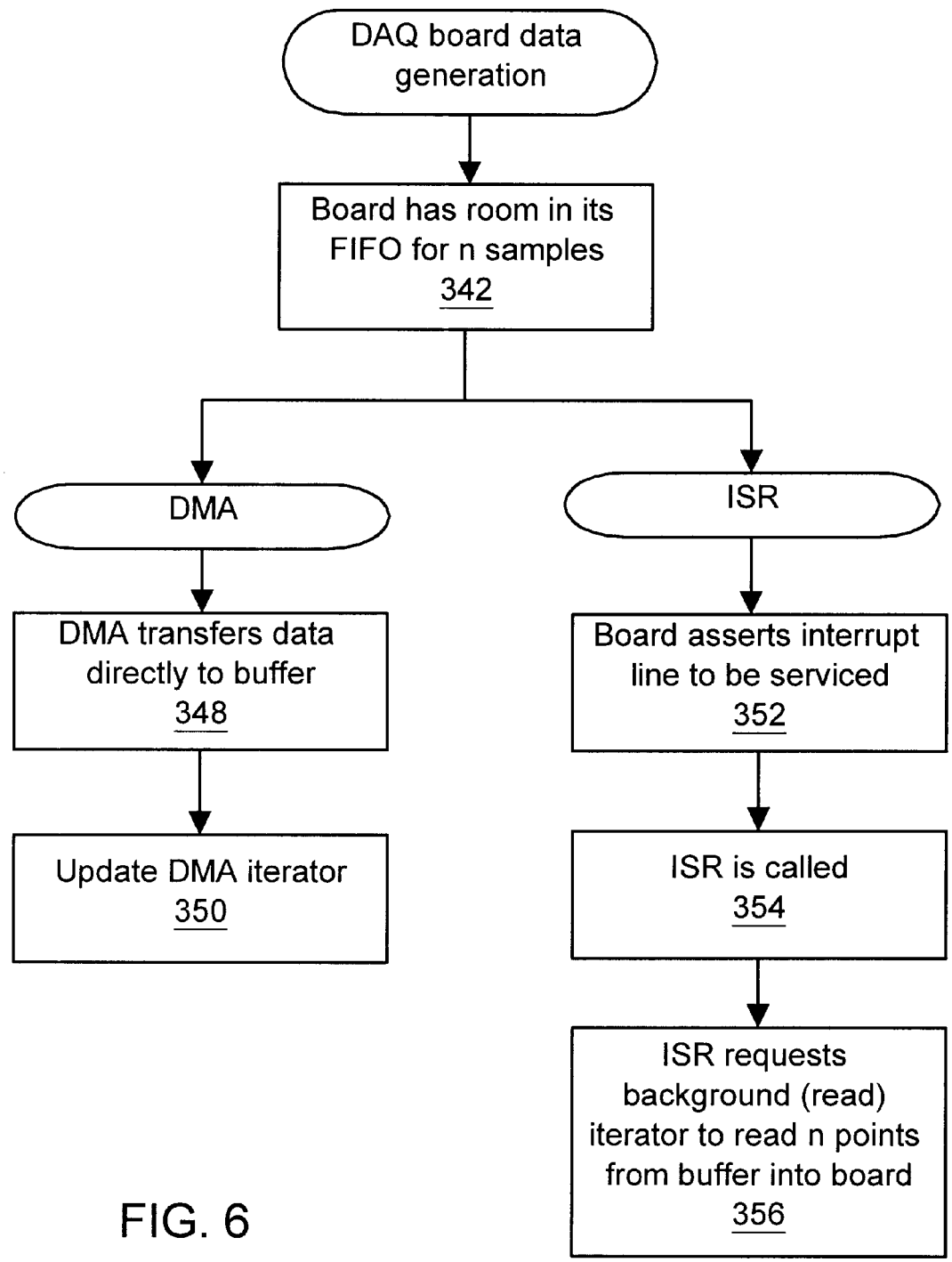
FIG. 6 is a flowchart illustrating a DAQ board generation or write using the buffer object of the present invention.

FIG. 6—Flowchart Diagram: Data Generation

FIG. 6 is a flowchart diagram illustrating operation of a data generation according to the present invention. More specifically, FIG. 6 illustrates operation of a write transfer from the buffer object portion of shared memory to the DAQ board 104. Thus FIG. 6 is similar to FIG. 5, except that FIG. 5 illustrates a read transfer involving an acquisition by the board 104, and FIG. 6 illustrates a write transfer involving data generation by the board 104. Thus, as with FIG. 5, the steps in the flowchart of FIG. 6 occur after the data transfer is started in step 214 of FIG. 3.

The flowchart of FIG. 6 presumes that the steps performed in the flowchart of FIG. 3 were performed and operated to configure the DAQ board 104 for a write operation, i.e., analog or digital output. Thus, it is presumed that, in the flowchart of FIG. 3, the DAQ driver level software operated to instantiate the buffer object in step 206 as well as foreground and background iterators in steps 208 and 210. Also, the DAQ driver level software operated to configure the board 104 in step 212 for a write.

In step 214 the data transfer was started, wherein the computer system begins writing or generating data to be provided to the DAQ board 104. This involves the foreground iterator writing data to the buffer object portion of the system memory. In this case the foreground iterator is a write iterator which operates to write data from the client buffer in system memory into the buffer object portion of system memory.

After the data transfer has been started, in step 342 when the DAQ board 104 has room in its FIFO for N samples, the DAQ board 104 generates a request or an interrupt. Thus here it is presumed that the event that causes the request or interrupt to be generated comprises the board having room in its FIFO for N samples.

When the DAQ board 104 has room in its FIFO for N samples in step 342, then the board requests service. If DMA capabilities are available in the DAQ system, then the board 104 generates a DMA request to request a DMA transfer. In step 348 DMA operations are used to transfer data from the buffer object portion of system memory to the DAQ board 104. In the preferred embodiment, a request is made to a DMA object, and the DMA object operates to perform the DMA transfers, preferably using a DMA iterator. If DMA capabilities are available, then preferably DMA operations are also used, instead of the foreground iterator, to transfer data from the client portion of system memory to the buffer object portion of system memory. In step 350, the DMA object updates the DMA iterator after the DMA transfer, and operation completes.

If the DAQ board 104 and/or the computer system 102 do not support DMA capabilities, then in step 352 the DAQ board 104 generates an interrupt. In this case, the DAQ board 104 asserts an interrupt line to be serviced.

In step 354 an interrupt service routine (ISR) is invoked in response to the interrupt. In step 356 the ISR executes and requests the background iterator, which in this cases is a read iterator, to read N points from the buffer object in system memory to the DAQ board 104. The ISR calls the read iterator, which operates to transfer data from the buffer object portion in system memory to the hardware FIFO on the DAQ board 104. The background iterator preferably formats the data and then transfers the data. In the preferred embodiment, the background iterator accesses the data format information in the buffer object to properly format the data prior to the transfer.

As the data is transferred by the foreground iterator from the client portion of system memory to the buffer object shared memory in the system memory, the buffer object becomes more full and will wrap around as the data transfer continues. Meanwhile, in the background whenever the DAQ board 104 has room for N samples, the ISR is invoked, directing the background iterator to transfer the data from the shared memory in the buffer object to the memory on the DAQ board 104, as shown in FIG. 6.

For example, if the client desired to generate 1,000 points with a second delay or 10 second time out, the foreground iterator would attempt to write 1,000 points within 10 seconds. More specifically, the foreground iterator would attempt to transfer 1000 points from the client portion of system memory to the buffer object in system memory.

The background iterator determines how much of the buffer has been filled up by the foreground iterator, and the background iterator attempts to stay just behind the foreground iterator moving data into the DAQ on-board memory. In other words, the background iterator attempts to move data out of the buffer object shared memory as soon as the data arrives. Thus whenever the background iterator is invoked and notices that new data is present in the buffer object, the background iterator moves the data into the memory on the DAQ board 104.

Thus one iterator attempts to keep up with the other iterator. When a time out occurs, one iterator stops transferring data and notifies the other iterator of an error. The operation of read and write iterators is discussed further below with respect to FIG. 8.

FIG. 6 thus illustrates a transfer involving the buffer object and the iterators in the case of a data generation by the DAQ board 104. In summary, when the client requests a data transfer, this causes the DAQ driver level software to instantiate the buffer object and the iterator objects. After the buffer object and the iterator objects are instantiated and configured, then the data transfer may be initiated. In the preferred embodiment, the foreground iterator transfers data to be generated from the client portion of system memory to the buffer object portion. When the DAQ board has room in its FIFO or memory for N samples, the DAQ board requests a transfer. If DMA capabilities are present, then the board requests a DMA transfer, and DMA transfers are performed, preferably using a DMA object. If DMA capabilities are not available, the board 104 generates an interrupt. The interrupt causes an ISR to be generated, which initiates the data transfer. The ISR uses the services of a background iterator to accomplish the transfer from the buffer portion in system memory to the DAQ board memory.

FIG. 7

Figure 7:
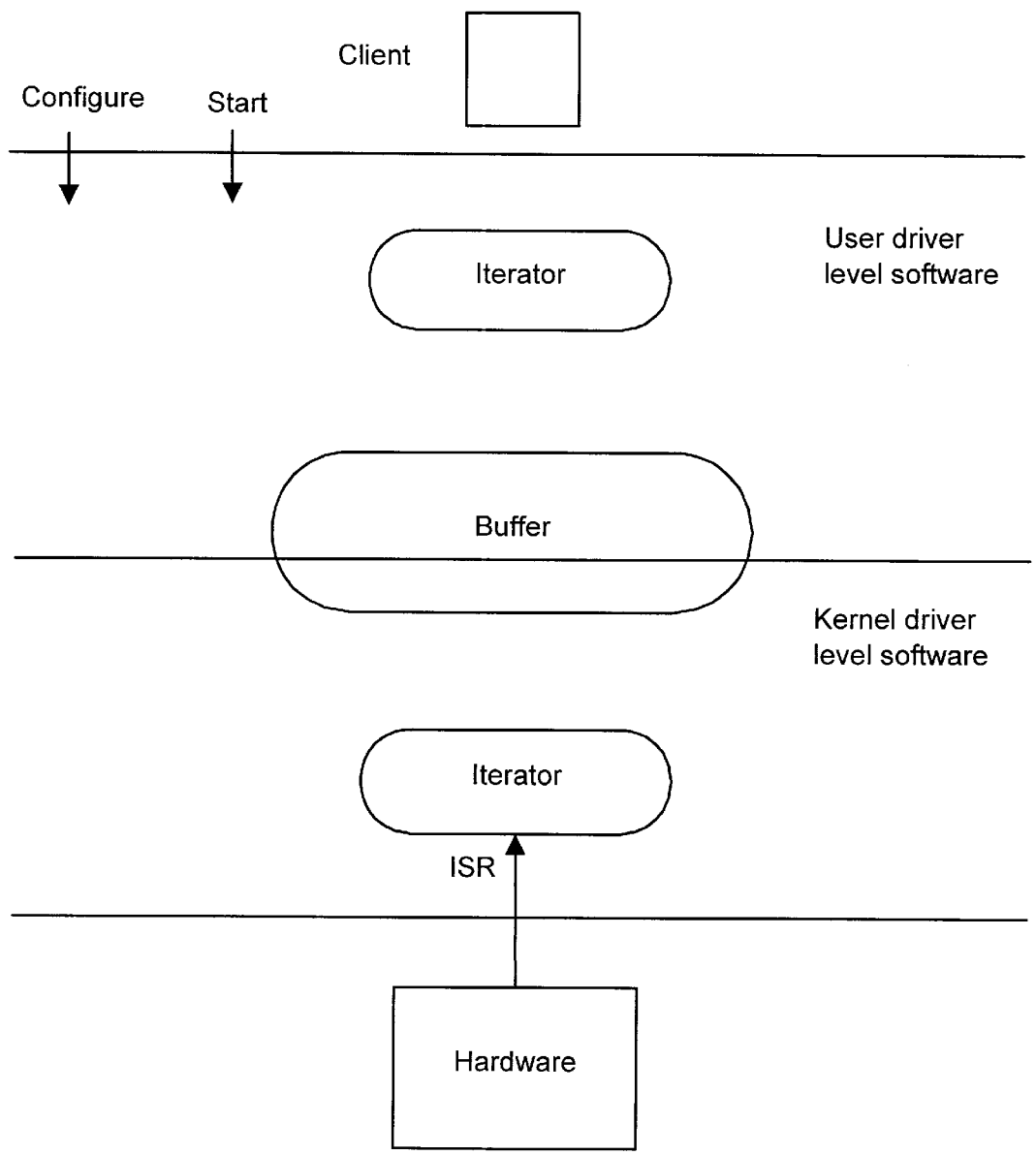
FIG. 7 illustrates the relationship of the buffer and iterator objects in performing a transfer.

FIG. 7 illustrates the objects being used in a data transfer according to the present invention. When the client desires to perform a data transfer, the client and/or the driver level software configures the DAQ board and instantiates the various objects, i.e., the iterator objects and the buffer object. After configuration, when the data transfer is started, this starts the DAQ hardware or DAQ board 104.

In the case of a data acquisition, when the DAQ board 104 has acquired N samples and generates an interrupt, the ISR invokes the background iterator to transfer data from the hardware FIFO into the buffer portion of system memory, i.e., the buffer object. As this occurs, the buffer becomes full and will wrap to the beginning of the buffer as the data transfer continues. Meanwhile, in the foreground, whenever the ISR is not running, the client directs the foreground iterator to transfer data from the buffer portion to the client portion of system memory. For example, if the client desires to read 1,000 points with a 10 second delay or 10 second time out, the client and/or the driver level software directs the foreground iterator to attempt to read out 1,000 points within 10 seconds. The foreground iterator continually monitors how much of the buffer has been filled up by the background iterator and attempts to stay "right behind" the background iterator in moving data into the client buffer. In other words, the foreground iterator attempts to move data out of the buffer portion as soon as the background iterator transfers data into the buffer portion. Thus, whenever the foreground iterator receives CPU cycles, and there is new data in the buffer, the foreground iterator moves the data into the client's foreground buffer. Thus, one iterator attempts to "keep up" with the other iterator. If a time out occurs, the foreground iterator will stop transferring data and indicate an error to the client.

In the case of a data generation, when the client generates the data, the foreground iterator operates to transfer the data from the client portion of system memory to the buffer portion of system memory. As this occurs, the buffer becomes full and will wrap to the beginning of the buffer as the data transfer continues. When the DAQ board 104 has availability for N samples, the board 104 generates an interrupt, and the ISR invokes the background iterator to transfer data from the buffer portion of system memory, i.e., the buffer object, to the on-board memory. The background iterator continually monitors how much of the buffer has been filled up by the foreground iterator and attempts to stay "right behind" the foreground iterator in moving data into the client buffer. In other words, the background iterator attempts to move data out of the buffer portion as soon as the foreground iterator transfers data into the buffer portion. Thus, one iterator attempts to "keep up" with the other iterator. If a time out occurs, the foreground iterator will stop transferring data and indicate an error to the client.

FIG. 8—Operation of an Iterator

Figure 8A:
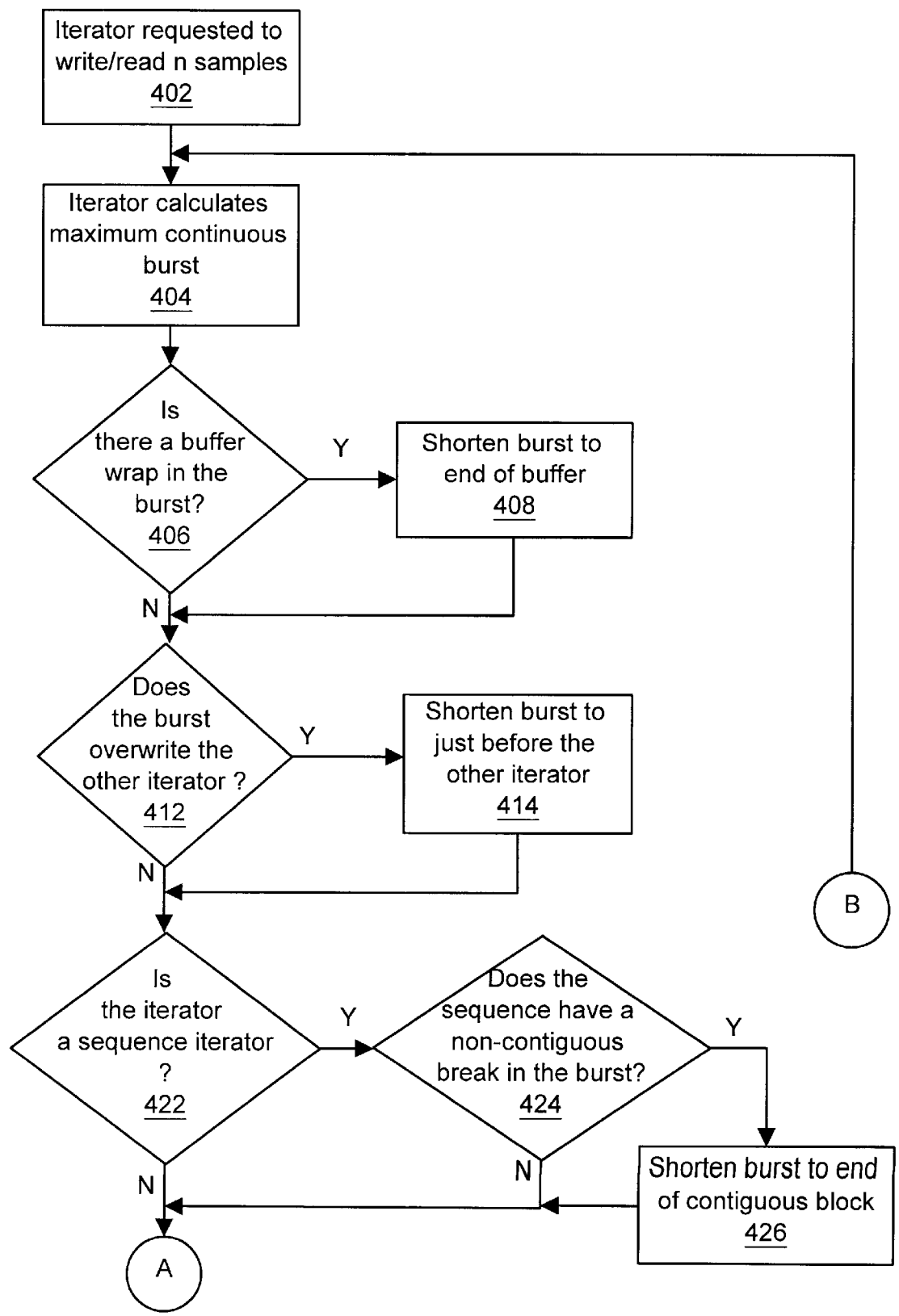
FIGS. 8A and 8B are a flowchart diagram illustrating the operation of an iterator.
Figure 8B:
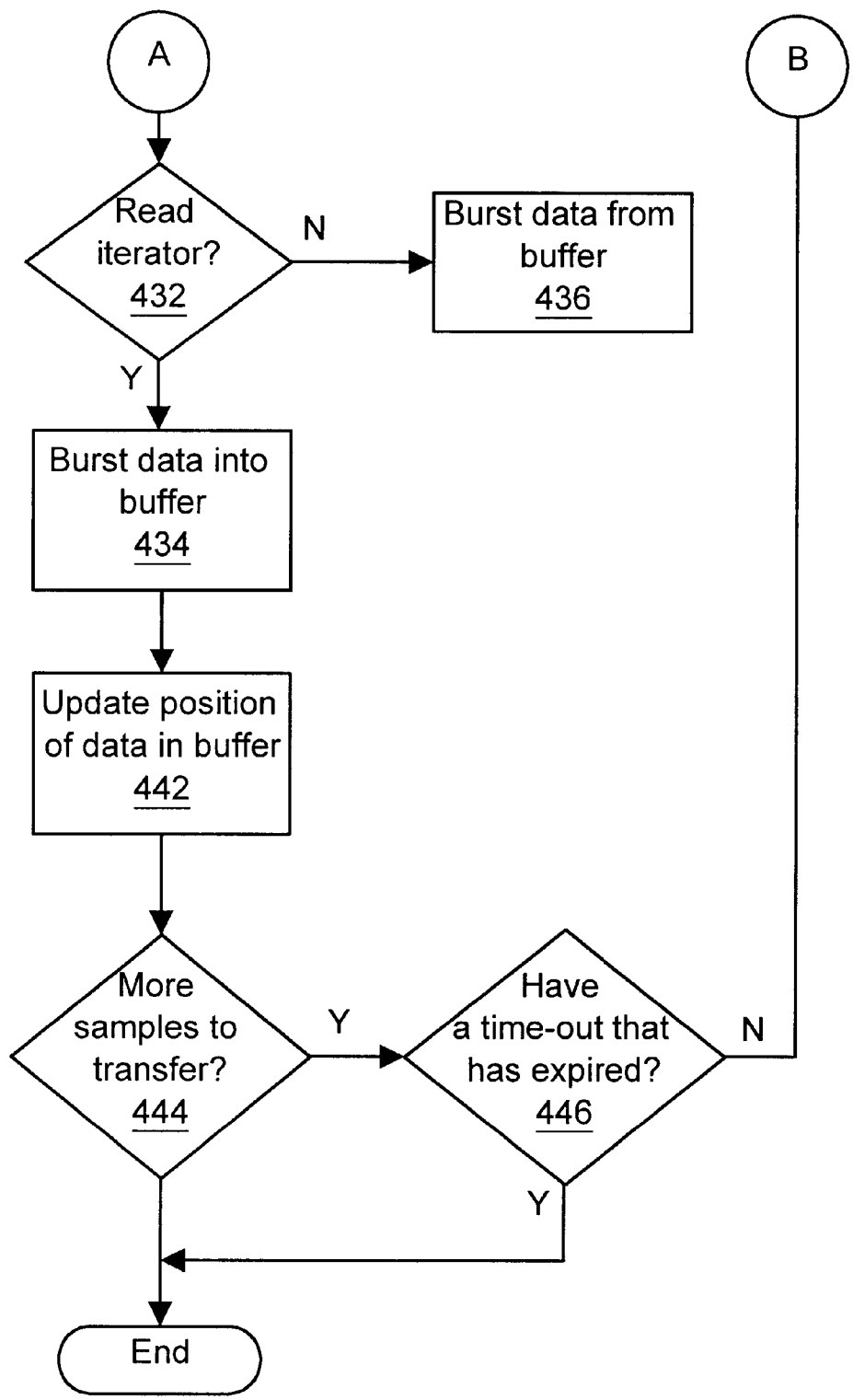

FIGS. 8A and 8B are a flowchart diagram which generically illustrates operation of an iterator. FIGS. 8A and 8B illustrate both foreground and background iterators operating either to read or write data to the buffer object. It is noted that when the DAQ board is configured for a read operation or acquisition, the background iterator serves as a write iterator to the buffer object, and the foreground iterator associated with the client application functions as a read iterator to read data from the buffer object. When the operation is a write to the DAQ board, i.e., a data generation, the foreground iterator associated with the client applications serves as a write iterator to write data to the buffer object, and the background iterator serves as a read iterator to read data from the buffer object to the DAQ board 104.

As shown, in step 402 the iterator is requested to write/read N data samples.

In response to the request in step 402, in step 404 the iterator calculates the maximum continuous burst that can be performed. In the preferred embodiment, the iterator uses the value N as the maximum continuous burst.

In step 406 the iterator determines if there is a buffer wrap in the burst. Here it is noted that the iterator will know its position within the buffer object and will also know the end of the buffer or the buffer length. Thus, in step 406 the iterator determines whether it would overwrite the buffer if the iterator performs the maximum continuous burst determined in step 404. If the iterator determines that it would not overwrite the buffer by performing the burst, then operation proceeds to step 412. If the iterator determines in step 406 that the burst transfer will wrap the buffer, then in step 408 the iterator shortens the burst to the end of the buffer. Thus, if the iterator determines, based on its position within the buffer object and the length of the buffer object, that the maximum continuous burst will wrap the buffer, then the iterator shortens the burst to exactly the end of the buffer object. Operation then proceeds to step 412.

In step 412 the iterator determines if the burst will overwrite the other iterator, i.e., if the burst data transfer will cause the iterator to pass the position of the other iterator. This is necessary to prevent, for example, a read iterator reading past the position where is the write iterator has written data, causing the read iterator to read incorrect data. This is also necessary to prevent a write iterator from over-writing the position of the read iterator, causing the read iterator to miss data. If the iterator is a foreground iterator, then the foreground iterator determines if the burst data transfer will overwrite the background iterator. If the iterator is a background iterator, then the background iterator determines if the burst data transfer will overwrite the foreground iterator.

This determination of whether the burst data transfer will overwrite the position of the other iterator uses a snapshot of the location of the other iterator. A portion of this step is discussed further with reference to FIG. 9. Thus, in step 412 the iterator determines the location of the other iterator and then uses this information to determine if its current burst will overwrite/read the position of the other iterator in the buffer object. If in step 4012 the iterator determines that the burst data transfer will over-write/read the other iterator, then in step 414 the iterator shortens its burst to a position just before the other iterator, and operation proceeds to step 424. If the iterator determines that its burst will not over-write/read the other iterator in step 412, then operation proceeds directly to step 422.

If the iterator is a sequence iterator as determined in step 422, then in step 424 the sequence iterator determines if the data transfer sequence has a non-contiguous break in the burst. If the sequence is determined to have a contiguous break in the burst in step 424, then in step 426 the sequence iterator shortens the burst to the end of the contiguous block. Operation then proceeds to step 432. If the sequence iterator determines that the sequence does not have a contiguous break in the burst, then operation proceeds directly from step 424 to step 432. Also, if the iterator is not a sequence iterator as determined in step 422, then operation proceeds directly from step 422 to step 432.

If the iterator is not a sequence iterator, then the iterator reads or writes data in a contiguous manner, i.e., one sample after the next. A sequence iterator is useful for applications such as de-multiplexing data or placing data from multiple channels in different orders. In essence, a sequence iterator is used to enforce a certain order in the way in which data is written.

If the iterator is a read iterator in step 432, then in step 434 the read iterator bursts data into the buffer, i.e., into the buffer portion of system memory corresponding to the buffer object. If the iterator is a write iterator, then in step 436 the write iterator bursts data from the buffer.

When the iterator bursts data to or from the buffer, if the iterator includes a scaling subclass, i.e., also is a scaling iterator, the iterator operates to scale the data, e.g., from binary to volts, on the fly as the data is transferred to/from the buffer. The scaling iterator can perform other types of scaling, as desired.

In either case, after the iterator operates to burst data to/from the buffer object, in step 442 the iterator updates the position of the data within the buffer object. In step 444 the iterator then determines if there are more samples to transfer. If not, then operation completes. If there are more samples to transfer, then in step 446 the iterator determines if a time-out period exists that has expired. If a time-out period exists and has expired, then operation completes. If a time-out period does not exist and/or a time-out period exists that has expired, as determined in step 446, then operation returns to step 404 and the above operations repeat.

In one embodiment of the invention, after determining that no time-out has expired in step 446, the iterator checks the status of the buffer object (the buffer portion in system memory) and determines if data is available for transfer (in the case of a read) or if space is available in the buffer object (in the case of a write). If a data transfer cannot be performed in response to checking the status of the buffer object, then the iterator preferably puts itself to sleep, so as to not consume valuable CPU cycles. The iterator is awakened by an event, wherein the event may be expiration of a time-out, or a read/write of data to the buffer object portion by the other iterator. In the case of a time-out expiring, the system wakes up the iterator thread, which then provides a message that the iterator was not successful. If the event comprises the other iterator performing a read/write to the buffer portion, then the iterator is awakened and can now perform a transfer.

As described above, in many instances the iterator transfers data between the shared memory buffer portion and external client memory, whereby the client requests the iterator to transfer from the shared memory into the client-owned memory. Here there is an implicit assumption that the client's memory is contiguous memory, e.g., a portion of system memory. However, in some situations the iterator is reading from the buffer object into a single register or other limited memory. This situation can occur, for example, where a board driver writer desires to read a burst of a thousand samples from a buffer object into a FIFO every time their ISR is called. In order to make this extremely fast, a callback function is preferably created. A read with a callback function is used, and the callback function is designed with knowledge of how to write data into the FIFO or limited memory. The callback function is used because the buffer object and/or the iterators cannot perform these functions.

Figures 9, 10:
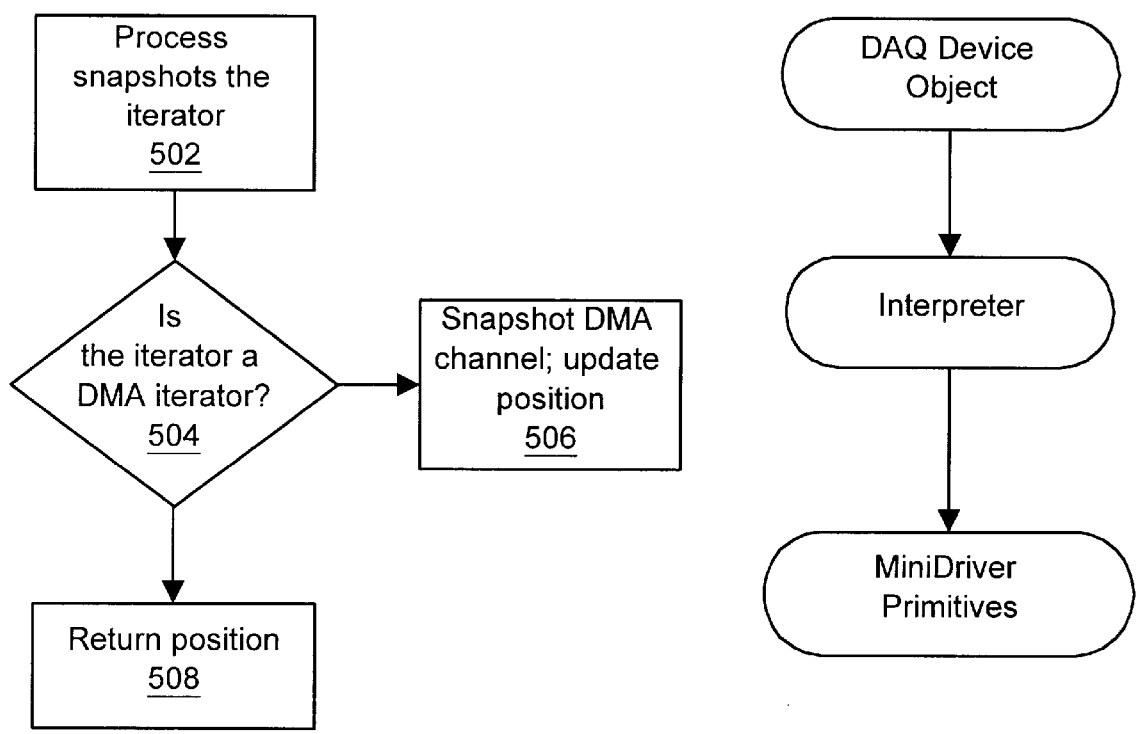
FIG. 9 illustrates a portion of step 408 of FIG. 8.
FIG. 10 illustrates a DAQ mini-driver software architecture of the preferred embodiment.

Consider an example where the callback is used to read a thousand points. The iterator performs all of the burst calculations regarding how many samples to move at one time, which the board driver itself does not know how to calculate. The iterator then calls the callback routine to burst that subset of N samples, in which case the board code very rapidly loops through those subset event samples to write to the FIFO and then return. After the callback function executes and returns, the iterator calculates the next burst. FIG. 9

FIG. 9 is a flowchart diagram illustrating operation of a portion of step 408 of FIG. 8, which comprises a portion of determining if the burst will overwrite the position of the other iterator. In step 502 a process calls an iterator to snapshot the position of the other iterator. If the iterator is determined to be a DMA iterator in step 504, i.e., includes a DMA iterator subclass, then a snapshot is taken of the DMA channel in which it is operating. The iterator then updates its position in step 508 and returns that position. If the iterator is not a DMA iterator in step 504, then the iterator returns its position in step 508.

Example

The following is an example of the use of the buffer object according to the present invention. This example presumes that a client of the DAQ driver level software, such as a DAQ user application, desires to perform a double buffered acquisition (reading) from the DAQ board. As noted above, the DAQ driver level software is preferably NI-DAQ from National Instruments. In this example, it is presumed that the NI-DAQ client is performing a scan of 5 channels and acquiring at a specified rate. Also, each one of the samples is 16 bits wide.

First, the DAQ driver level software instantiates a buffer object and provides the buffer object with the necessary information. Information that the buffer object is required to know includes the size of the samples, how many samples per scan, and how many scans are in the buffer. This provides a basic data format.

The DAQ driver level software then creates a foreground iterator, which is designed to know how to read data from the buffer. As one example, the DAQ driver level software could create a generic iterator and inform the generic iterator as to which channels it is interested in reading, which is part of the data format of the buffer. If scaling is desired, the DAQ driver level software preferably instantiates a scaling subclass of the iterator. In this instance, when data is read from the iterator, the iterator actually scales the data as well. The DAQ driver level software may also create a sequence iterator which de-multiplexes the data as it comes out by reading it in a non-sequential order. The DAQ driver level software may also create other types of iterators, as desired.

The DAQ driver level software also creates a background iterator which is created in the kernel. The background iterator preferably executes in kernel mode in order to control and/or communicate with hardware, e.g., the DAQ device. The background iterator is preferably different than the foreground iterator. The background iterator could be used for programmed I/O, where every time an ISR is called, data is read from the FIFO and then written it into the iterator.

If DMA is available, the application uses a DMA iterator which is tightly bound with a DMA object to allow the hardware to assume more of the processing power. Thus, if the application has access to a DMA channel, the application would rather use DMA to transmit the data instead of programmed I/O.

In addition, the DAQ driver level software programs or configures the board to start acquiring data and perform other programming of the registers.

The foreground iterator is owned by the DAQ driver level software foreground process. The foreground/background process are essentially the same entity. However, the background process owns the background iterator, and generally the background iterator is being run at interrupt time. Thus, if programmed I/O is being performed, at interrupt time the background process of the DAQ driver level software dumps data into the background iterator, also referred to as the write iterator. The write iterator includes knowledge about how to format the data. The write iterator thus formats the data and places the data in the buffer object. The write iterator also handles all the problems associated with transfers across networks or transfers into shared memory, as well as other issues. Every time an interrupt occurs, the write iterator transfers the data. The write iterator also handles errors such as overwriting the other iterator or waiting and sleeping until there is space available in the buffer object. The foreground iterator has these same capabilities.

Thus, using the buffer object and the iterators, the DAQ application can perform operations, such as reading a million points, with limits such as: do not read too many, do not read data that doesn't exist yet, and can wait up to 10 minutes to perform the acquisition. The buffer object and the iterators include the necessary intelligence for these functions, thus freeing up the programmer from having to create code for this functionality.

If the DAQ driver level software uses a background DMA iterator, the DMA iterator can couple with the DMA object such that DMA actually dumps the data into the memory and updates the iterator with its positions. The use of the DMA iterator in this fashion operates to offload the CPU's position processing to DMA.

Seek Method

In the preferred embodiment, iterators include a seek method which allows them to select data for transfer. The seek method can be used to skip selected samples, i.e., to seek ahead or behind to a point in the buffer and then begin data transfers. The seek method can also be used to seek ahead N samples or seek behind N samples relative to a position in the buffer. In the preferred embodiment, the default absolute position is the current position in the buffer. The position could also be set to be relative to the position of the other iterator.

For example, consider a foreground client that only occasionally graphs data, such as based on certain external events. In this example, the background iterator is acquiring data and storing the data in the buffer object. The foreground client can desire to view the last 100 acquired samples, regardless of the number of samples that have been acquired, and hence regardless of whether some samples will be lost. In this case, the foreground client instructs the foreground iterator to "seek relative" 100 samples behind the background iterator. In response, the foreground iterator repositions or moves 100 samples into the buffer behind the position of the background iterator, and begins reading this data. As a result, the foreground iterator would only read the last acquired 100 samples. This provides added flexibility in operation of the iterators.

FIG. 10—DAQ driver level software architecture

FIG. 10 is a block diagram which illustrates the software architecture of the DAQ driver level software according to the preferred embodiment. According to the preferred embodiment, the DAQ driver level software comprises a modular software architecture which includes a DAQ device object layer, an interpreter layer, and a mini-driver primitives layer.

The DAQ driver level software comprises DAQ device object software, also referred to as device class software. The DAQ device object comprises a software object corresponding to the particular device installed in the DAQ system. In general, each DAQ device installed in the DAQ system includes a corresponding DAQ device software object installed in the system.

In the preferred embodiment, the DAQ system includes a base device class which is a template used for creation of a device class. A device class is thus a class, preferably a C++ class, that inherits from a base device class. The base device class includes a plurality of NI-DAQ functions. Virtually every NI-DAQ function in the base device class returns a noSupportError, meaning that the function is not supported by the device. This is because the base device class is a template for the creation of DAQ objects, and the template itself does not support any functions. When a device class is created or instantiated from a base device class for a particular device, such as a PCI-MIO-16E-1 or an AT-4350, the device class (e.g., ESeriesDevice) overrides the functions in the base device class that the device class will support. The functions that the device class does not override continue to return noSupportError, since the base class implementation is used.

The primary purpose of the DAQ device object is to create the respective interpreters and mini-driver primitives used in controlling the respective DAQ device. In the preferred embodiment, the DAQ device object first creates a mini-driver code portion or object which in turn creates the mini-driver primitives. In the preferred embodiment, the DAQ device object also acts to receive calls from the DAQ user application and forward these calls to the appropriate interpreter.

The DAQ driver level software also includes one or more interpreters. Each interpreter is comprised of a set of public functions that can be called by a user application. An interpreter can use various managers available in NI-DAQ software, including a memory manager, a buffer manager, and a bus object, among others. The interpreter comprises all of the common tasks that a family of DAQ boards require, or that all DAQ boards require, and which can be made hardware independent. In other words, each of the interpreters performs functionality which is common for a plurality of DAQ devices, such as buffering, messaging which does not require board programming, setting up SCXI and AMUX attachments to the device, performing parameter validation on incoming function parameters and scaling to engineering units, among others. In the presently preferred embodiment, the interpreter does not include a base class.

An interpreter implements a subset of an interface, such as the NI-DAQ language interface, a LabVIEW interface layer, or another interface. Interpreters operate to call or invoke mini-driver primitives, which perform the low-level work that is hardware specific. Interpreters are useful because they can be used by multiple device classes, as long as there is similar functionality.

The DAQ driver level software further includes a plurality of mini-driver primitives. The term "mini-driver primitive" or "primitive" is used herein to refer to a body of code that performs a portion of the programming of and communication with the DAQ board. Each of the mini-driver primitives thus performs a portion of controlling the DAQ device. In other words, the DAQ device includes a plurality of hardware resources for performing DAQ functions, and each of the plurality of mini-driver primitives controls one of the hardware resources. For example, where the plurality of hardware resources on the DAQ board include an analog input channel 1, an analog output channel 1, a digital port 0, a waveform generator, and a counter, the plurality of mini-driver primitives include an Analog Input Channel 1 (AI Channel 1) engine or primitive, an Analog Output Channel 1 (AO Channel 1) engine or primitive, a Digital Port 0 (Dig Port 0) primitive or engine, a waveform engine (WFM Engine) primitive, and a counter engine (CTR Engine) primitive. A board may also include a group engine. For example, in a DIO-32HS board, which has 4 digital ports, each port includes a corresponding digital port primitive, and the digital group primitive controls multiple digital port primitives HELP.

A mini-driver code portion is used to create each of a plurality of mini-driver primitives, each of which implement a subset of board functionality. Thus, in the present application, when it is stated that a mini-driver performs a function, in actuality a mini-driver primitive (or primitives) carries out the action.

Thus, the interpreter comprises the generic functionality which is generic to or independent of a number of DAQ devices or boards, i.e., is independent of a family of devices, and the mini-driver primitives comprise the board-specific functionality. This provides improved modularity and allows for more efficient and effective re-use of code.

For more information on the mini-driver architecture of the preferred embodiment, please see related co-pending application Ser. No. 08/946,804 titled "Mini-Driver Software Architecture for a Data Acquisition System", filed Oct. 8, 1997, which is hereby incorporated by reference as though fully and completely set forth herein.

Figure 11:
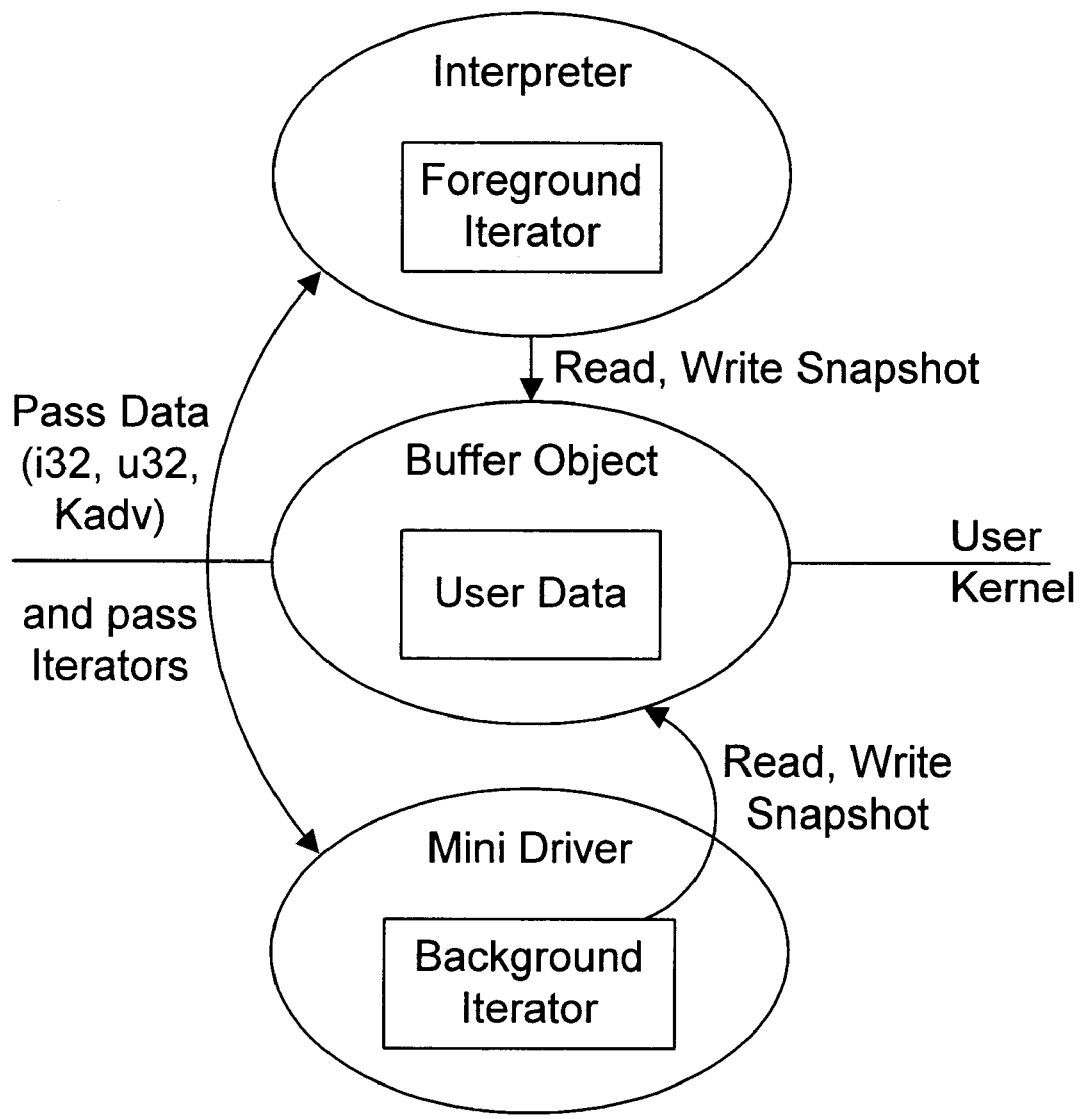
FIG. 11 illustrates the relationship between the buffer object and the mini-driver DAQ architecture.

FIG. 11—Iterators and the Buffer Object

As described above, the buffer object is a software object which makes data movement from user buffers to the DAQ Device easier and consistent between devices. FIG. 11 illustrates the relationship between mini-drivers and the buffer object. The interpreter creates a buffer object, which can use an existing, user-allocated buffer, or can allocate the buffer itself. The interpreter then creates an iterator for the mini-driver to use, and possibly another iterator for its own use.

Example: When doing double-buffered analog input, the mini-driver will read data from the AI FIFO, and using its iterator (background iterator), write data to the circular buffer (the box labeled 'user data' in FIG. 11). The interpreter uses its iterator (foreground iterator) to read data out of the circular buffer. An overwrite error can be detected by the mini-driver iterator when a write is attempted. The write iterator will bump up against the read head, and recognize that the user has failed to read data out of the circular buffer fast enough. The mini-driver could shut down the acquisition, noting the reason (an overwrite error). The iterator can also be instructed to ignore such issues and just write data to the circular buffer regardless of the position of the read head.

The buffer object is mainly used to move data to and from user buffers, but can also be used internally to move other data, such as a set of calibration constants, or the MUX gain entries for AI Scanning. This helps overcome the limited mini-driver interface that only allows standard data types to be sent from the interpreter to the primitives.

Example: WFM Group Control (Start)

This example demonstrates many interpreter, mini-driver, and buffer object concepts.

```
tStatus AOWFMInterpreter::WFMStart (const i16 group)
{
  tStatus err = noError;
  i16 grpIndex = group -1; // This makes indexing easier, since groups start with 1
  u32 i;
  mdVal cookedDataTransferMethod;
  // Lock the WFMEngine for this group, and all the AO channels in this group
  // Everything is unlocked in the Stop call.
  err = cWFMEnginePtr[grpIndex]—>Lock ( );
  if(err != noError)
    return groupBusyError;
  err = LockTheseChannels (chansToStartBitmap[grpIndex]);
  if(err != noError) {
    // unlock the WFMEngine
    DaqErrAssert (cWFMEnginePtr[grpIndex]—>Unlock( ));
    return chanBusyError;
  }
  err = groupBuffer[grpIndex]—>CreateIteratorForMini-driver
    (cookedDataTransferMethod);
  if(err != noError)
   return err;
  // If double buffering is on for the group, we need to create a write iterator.
  if(DBOn[grpIndex]) {
    err = groupBuffer[grpIndex]—>CreateIteratorForInterpreter ( );
    if(err != noError)
      return err;
  }
  // Deal with messaging, as long as we're not doing FIFO-mode waveform
  if (cookedDataTransferMethod != kmdvForeground) {
    err = SetupMessaging (group);
    if(err != noError) {
      ClearMessaging (group); // intentionally do not look at error
      return err;
    }
  }
}
// **************************************************
// Send lots and lots of attributes down to the mini-driver
// **************************************************
  cWFMEnginePtr[grpIndex]—>Set(kmdaWhatToDo, groupBuffer[grpIndex]—>mode ?
              kmdvFIFOModeWaveform : kmdvWaveformGeneration);
  cWFMEnginePtr[grpIndex]—>Set(kmdaChannelBitmap,
chansToStartBitmap[grpIndex]);
  // Set Transfer Method (IRQ, DMA, Foreground) and FIFO information
  cWFMEnginePtr[grpIndex]—>Set(kmdaDataTransferMethod,
cookedDataTransferMethod);
  cWFMEnginePtr[grpIndex]—>Set(kmdaDataTransferCondition,
groupFIFOInfo[grpIndex]—>
    GetAppropriateDataTransferCondition (cookedDataTransferMethod));
  // Set buffer information and iterator
  cWFMEnginePtr[grpIndex]—>Set(kmdaBufferIterations,    groupBuffer[grpIndex]—
>iterations);
  cWFMEnginePtr[grpIndex]—>Set(kmdaPosttriggerCount,    groupBuffer[grpIndex]—
>bufferPoints);
  err = cWFMEnginePtr[grpIndex]—>SetIterator (groupBuffer[grpIndex]—>rIteratorPtr);
  // Set update clock information
  cWFMEnginePtr[grpIndex]—>Set(kmdaBigBenClockSource,
            groupClockInfo[grpIndex].clockSource);
  cWFMEnginePtr[grpIndex]—>Set(kmdaBigBenClockInterval,
                groupClockInfo[grpIndex].clockInterval);
  // Set timebase information
  cWFMEnginePtr[grpIndex]—>Set(kmdaBigBenTimebaseSource,
            groupClockInfo[grpIndex].timebaseSource);
  if(groupClockInfo[grpIndex].timebaseSource == kmdvInternalTimebase)
```

-continued

```
    cWFMEnginePtr[grpIndex]—>Set(kmdaBigBenTimebaseFrequency,
              groupClockInfo[grpIndex].timebaseFrequency);
// Send messaging info down to the mini-driver
    cWFMEnginePtr[grpIndex]—> Set(kmdaRunMessaging, runMessaging);
    cWFMEnginePtr[grpIndex]—> Set(kmdaEndMessaging, endMessaging);
    if(runMessaging == kmdvOn)
        cWFMEnginePtr[grpIndex]—>         Set(kmdaRunMessagePtr,      (void*)
&messageRunBlockRef);
     if (endMessaging == kmdvOn)
        cWFMEnginePtr[grpIndex]—>         Set(kmdaEndMessagePtr,      (void*)
&messageEndBlockRef);
    // Indicate whether or not old data stop is on for this group
    cWFMEnginePtr[grpIndex]—> Set(kmdaOldDataStop, oldDataStopOn[grpIndex] ?
              kmdvOn : kmdvOff);
    if (err == noError)
       err = cWFMEnginePtr[grpIndex]—>Control(kmdcStart); // start will call program
    return err;
}
```

API of the Preferred Embodiment

The following describes the application programming interface (API) of the preferred embodiment.

Class tBuffer public class tBuffer

Platform Abstraction Layer Package

The tBuffer class is responsible for encapsulating a data transfer buffer. Data is transferred between foreground and background processes through this class. Access to this tBuffer occurs by means of read/write heads, or Iterators. Very few (if any) operations may be performed by users directly on buffers.

Methods memoryreference public tNIBlockReference memoryReference()

Returns a block reference to the object's internal memory block. This memory block is always page locked.

Class tIterator public class tIterator

Platform Abstraction Layer Package

The tIterator class provides access to tBuffer objects. Each iterator maintains its own separate access mode (read/write) and position, as well as maintaining information on channel striding, scaling transformations, and conditions to be detected during data movement. Operators are provided to seek around in the buffer (change the iterator's position), and to read or write one or more values of the basic type, with or without a scaling transformation.

```
isOwner
public tBoolean isOwner( ) const
         Returns whether the object is the owner of the internal memory block. True
indicates that the object allocated the memory block, while false indicates that the
memory block was allocated externally.
sizeInSamples
public static u32 sizeInSamples( ) const
         Returns the number of samples that the object can hold at a time.
bytesPerSample
public u32 bytesPerSample( ) const
         Returns the size of an individual sample in bytes.
samplesPerScan
public u32 samplesPerScan( ) const
         Returns the number of samples that make up a logical scan.
sizeInScans
public u32 sizeInScans( ) const
         Returns the number of scans that the object can hold at a time.
blockReference
public tNIBlockReference blockReference( ) const
         Returns a block reference to the object. The object is always page locked.
debugDump
public void debug(Dump(u32 indent = 0)
         Dumps the object's state to the debug window when compiled in debug mode.
         Parameters:
              indent - The amount to indent the debug text in the debug window.
``` seek(i32)
public void seek(i32 n)
    Seeks an iterator ahead multiple samples.
    Parameters:
        n - The number of samples to seek. A negative value will cause the iterator
    to seek backward.
seek(i32, Origin)
public void seek(i32 n, Origin origin)
    Seeks an iterator ahead multiple samples relative to the supplied origin.
    Parameters:
        n - The number of samples to seek. A negative value will cause the iterator
    to seek backward.
        origin - The buffer location from which to begin seeking.
seek(i32, tIterator)
    public void seek(i32 n, tIterator origin)
    Seeks an iterator ahead multiple samples relative to the supplied origin.
    Parameters:
        n - The number of samples to seek. A negative value will cause the iterator
    to seek backward.
        origin - The iterator whose location is used to begin seeking from.
operator++ (int)
public void operator++(int)
    Seeks an iterator ahead 1 sample.
operator-- (int)
public void operator--(int)
    Seeks an iterator back 1 sample.
operator+= (i32)
public void operator+=(i32 n)
    Seeks an iterator ahead multiple samples.
    Parameters:
        n - The number of samples to seek. A negative value will cause the iterator
    to seek backwards.
operator-= (i32)
public void operator-=(i32 n)
    Seeks an iterator back multiple samples.
    Parameters:
        n - The number of samples to seek backward. A negative value will cause
    the iterator to seek forward.
snapshot
public u64 snapshot( ) const
    Returns my virtual position in the buffer. For example, an iterator which has
wrapped a 1000 sample buffer twice and is at sample offset 10 would return 2010.
snapshot (u64&)
public u64 snapshot(u64& otherPosition) const
    Returns the virtual position of both myself and the other iterator.
    Parameters:
        otherPosition - The virtual position of the most lagging, opposite direction
        iterator.
read (T&, timeStruct*)
public Status read(T& memory, timeStruct* timeoutPtr = NULL)

Reads the next sample from the buffer object. If the sample is not available, the iterator will return an error. If a timeout is supplied, the iterator will continue trying until the timeout expires. The iterator will automatically advance with a successful read.

Reads multiple samples from the buffer object into the supplied memory block. If some of the samples are unavailable, the iterator will read what it can and then return an error. If a timeout is supplied, the iterator will continue trying until the timeout expires. The iterator will be positioned after the last successful read.

Parameters:
        memory - The location to read the sample into.
        timeoutPtr - The amount of time to wait before giving up on unavailable
    data. If no timeout is supplied, the read will be attempted just once.
readBlock(T*, u32, u32*, timeStruct*)
public Status readBlock(T* memoryPtr, u32 n, u32* validN = NULL, timeStruct* timeoutPtr = NULL)

Parameters:
    memoryPtr - The memory block to read the samples into.
    n - The number of samples to read.
    validN - If supplied, validN will return the total number of successfully read samples during this call.
    timeoutPtr - The amount of time to wait before giving up on unavailable data. If no timeout is supplied, the read will be attempted just once.
readBlock (Tcallback, void*, u32, u32*, timeStruct*)
public Status readBlock(TCallback callback, void* reservedForCallback, u32 n, u32* validN = NULL, timeStruct* timeoutPtr = NULL)

---

Reads multiple samples from the buffer object using a user defined callback. The callback is useful when the destination is not simple sequential memory. An example could be an Analog Output FIFO, which only the device driver writer could know how to access. If some of the samples are unavailable, the iterator will read what it can and then return an error. If a timeout is supplied, the iterator will continue trying until the timeout expires. The iterator will be positioned after the last successful read.

Writes multiple samples to the buffer object from the supplied memory block. If there is not enough space in the buffer object for all the samples, the iterator will write what it can and then return an error. If a timeout is supplied, the iterator will continue trying until the timeout expires. The iterator will be positioned after the last successful write.

---

Parameters:
    callback - The callback function which has proprietary knowledge of what to do with read samples.
    reservedForCallback - An opaque pointer passed to the callback which can be used to retrieve one's context, such as an object pointer, or data structure.
    n - The number of samples to read.
    validN - If supplied, validN will return the total number of successfully read samples during this call.
    timeoutPtr - The amount of time to wait before giving up on unavailable data. If no timeout is supplied, the read will be attempted just once.
write (T, timeStruct*)
public Status write(T memory, timeStruct* timeoutPtr = NULL)

---

Writes the supplied sample to the buffer object. If there is not enough space in the buffer object for the sample, the iterator will write what it can and then return an error. If a timeout is supplied, the iterator will continue trying until the timeout expires. The iterator will automatically advance if the write was successful.

---

Parameters:
    memory - The sample to write into the buffer.
    timeoutPtr - The amount of time to wait before giving up on unavailable space. If no timeout is supplied, the write will be attempted just once.
writeBlock (T*, u32, u32*, timeStruct*)
public Status writeBlock(T* memoryPtr, u32 n, u32* validN = NULL, timeStruct* timeoutPtr = NULL)

---

Parameters:
    memoryPtr - The memory block to write the samples from.
    n - The number of samples to write.
    validN - If supplied, validN will return the total number of successfully written samples during this call.
    timeoutPtr - The amount of time to wait before giving up on unavailable space. If no timeout is supplied, the write will be attempted just once.

-continued

```
writeBlock (Tcallback, void*, u32, u32*, timeStruct*)
public Status writeBlock(TCallback callback, void* reservedForCallback, u32 n, u32*
validN = NULL, timeStruct* timeoutPtr = NULL)
```

Writes multiple samples to the buffer object using a user defined callback. The callback is useful when the source is not simple sequential memory. An example could be an Analog Input FIFO, which only the device driver writer could know how to access. If there is not enough space in the buffer object for all the samples, the iterator will write what it can and then return an error. If a timeout is supplied, the iterator will continue trying until the timeout expires. The iterator will be positioned after the last successful write.

```
    Parameters:
        callback - The callback function which has proprietary knowledge of
    where to get samples to write.
        reservedForCallback - An opaque pointer passed to the callback which can
    be used to retrieve one's context, such as an object pointer, or data structure.
        n - The number of samples to write.
        validN - If supplied, validN will return the total number of successfully
    written samples during this call.
        timeoutPtr - The amount of time to wait before giving up on unavailable
    space. If no timeout is supplied, the write will be attempted just once.
read(T&, Obliviousness)
public void read(T& memory, Obliviousness)
```

Reads the next sample from the buffer object. The iterator will read the sample and return no error even if the sample is not available. This is an optimized read for clients who have extra knowledge about the state of their buffer. The iterator will automatically advance.

```
    Parameters:
        memory - The location to read the sample into.
readBlock (T*, u32, Obliviousness)
public void readBlock(T* memoryPtr, u32 n, Obliviousness)
```

Reads multiple samples from the buffer object into the supplied memory block. The iterator will read the samples and return no error even if the samples are not available. This is an optimized read for clients who have extra knowledge about the state of their buffer. The iterator will be positioned after the last read.

```
    Parameters:
        memoryPtr - The memory block to read the samples into.
        n - The number of samples to read.
readBlock (Tcallback, void*, u32, Obliviousness)
public void readBlock(TCallback callback, void* reservedForCallback,
u32 n, Obliviousness)
```

Reads multiple samples from the buffer object using a user defined callback. The callback is useful when the destination is not simple sequential memory. The iterator will read the samples and return no error even if the samples are not available. This is an optimized read for clients who have extra knowledge about the state of their buffer. The iterator will be positioned after the last read.

```
    Parameters:
        callback - The callback function which has proprietary knowledge of what
    to do with read samples.
        reservedForCallback - An opaque pointer passed to the callback which can
    be used to retreive one's context, such as an object pointer, or data structure.
        n - The number of samples to read.
write (T&, Obliviousness)
public void write(T memory, Obliviousness)
```

Writes the supplied sample to the buffer object. The iterator will write the sample and return no error even if it must overwrite unread data. This is an optimized write for clients who have extra knowledge about the state of their buffer. The iterator will automatically advance.

```
        Parameters:
                memory - The sample to write into the buffer.
writeBlock (T*, u32, Obliviousness)
public void writeBlock(T* memoryPtr, u32 n, Obliviousness)
```

Writes multiple samples to the buffer object from the supplied memory block. The iterator will write the samples and return no error even if it must overwrite unread data. This is an optimized write for clients who have extra knowledge about the state of their buffer. The iterator will be positioned after the last write.

```
        Parameters:
                memoryPtr - The memory block to write the samples from.
                n - The number of samples to write.
writeBlock (Tcallback, void*, u32, Obliviousness)
public void writeBlock(TCallback callback, void* reservedForCallback,
u32 n, Obliviousness)
```

Writes multiple samples to the buffer object using a user defined callback. The callback is useful when the source is not simple sequential memory. The iterator will write the samples and return no error even if it must overwrite unread data. This is an optimized read for clients who have extra knowledge about the state of their buffer. The iterator will be positioned after the last write.

```
        Parameters:
                callback - The callback function which has proprietary knowledge of
            where to get samples to write.
                reservedForCallback - An opaque pointer passed to the callback which can
            be used to retreive one's context, such as an object pointer, or data structure.
                n - The number of samples to write.
buffer
public tBuffer buffer( ) const
        Returns the a reference to the buffer that I iterate across.
direction
public static Direction direction( ) const
        Returns the direction that I move data.
debugDump (u32)
public void debugDump(u32 indent = 0)
        Dumps my state to the debug window when compiled in debug mode.
        Parameters:
                indent - The amount to indent the debug text in the debug window.
T
public T
        Supported sample types.
        { u8, u16, u32 }
TCallback
public void(*TCallback)(void* reservedForCallback, T* memoryPtr, u32 n)
```

Callback function prototype for propriety data formats. On a block transfer, the iterator will calculate the maximal burst size based upon the end of the buffer, locations of other iterators, user defined striding, . . . etc. and call the client back to simply move the data.

```
                Parameters:
                        reservedForCallback - An opaque pointer that was passed to the read or
                    write method, which can be used to retreive one's context, such as an object
                    pointer, or data structure.
                        n - The number of samples to read or write this burst.
                Direction
                public enum Direction
                        Enumeration of supported directions.
                        { Read, Write }
```

```
-continued

Status
public enum Status
        Enumeration of supported stati.
        { NoError, OverWriteError, TimeOutError }
Origin
public enum Origin
        Enumeration of supported origins.
        { Beginning, BeginningOfOpposingIteratorScan, BeginningOfScan, Current,
EndOfScan }
Obliviousness
public enum Obliviousness
        Enumeration that defines the oblivious value.
        { Oblivious }
```

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A data acquisition (DAQ) system, comprising:

a computer system including a CPU and a system memory;

at least one data acquisition (DAQ) device coupled to the computer system, wherein the data acquisition device is operable to generate/receive data, wherein the DAQ device includes on-board memory;

a DAQ user application stored in the system memory of the computer system which is executable to perform data acquisition operations in the DAQ system;

DAQ driver level software stored in the system memory of the computer system which is executable to control the DAQ device, wherein the DAQ driver level software receives calls from the DAQ user application;

a buffer object stored in the system memory of the computer system, wherein the buffer object stores information regarding data to be transferred;

a foreground iterator stored in the system memory of the computer system which is executable to transfer data between a client portion of system memory and a buffer portion of system memory;

a background iterator stored in the system memory of the computer system which is executable to transfer data between the buffer portion of system memory and the on-board memory comprised on the DAQ device;

wherein the foreground iterator and the background iterator execute in response to the DAQ user application to perform transfers to/from the DAQ device;

wherein the foreground and background iterators use information in the buffer object to perform the data transfer.

2. The DAQ system of claim 1, wherein the background iterator is executable to transfer data from the on-board memory comprised on the DAQ device to the buffer portion of system memory;

wherein the foreground iterator is executable to transfer data from the buffer portion of system memory to the client portion of system memory.

3. The DAQ system of claim 2, wherein the DAQ device is operable to generate an interrupt when the memory on the DAQ device comprises a specified amount of data;

wherein the DAQ system further comprises an interrupt service routine (ISR) stored in the system memory of the computer system which is executable to direct the background iterator to transfer data from the on-board memory comprised on the DAQ device to the buffer portion of system memory.

4. The DAQ system of claim 1, wherein the foreground iterator is executable to transfer data from the client portion of system memory to the buffer portion of system memory;

wherein the background iterator is executable to transfer data from the buffer portion of system memory to the on-board memory comprised on the DAQ device.

5. The DAQ system of claim 4, wherein the DAQ device is operable to generate an interrupt when the memory on the DAQ device is available to receive a specified amount of data;

wherein the DAQ system further comprises an interrupt service routine (ISR) stored in the system memory of the computer system which is executable to direct the background iterator to transfer data from the buffer portion of system memory to the on-board memory comprised on the DAQ device.

6. The DAQ system of claim 1, wherein the buffer object stores data format information regarding a format of the data to be transferred, wherein said data format information comprises information regarding size of data, number of samples per scan, and number of scans of the data.

7. The DAQ system of claim 1, wherein the foreground and background iterators are executable to perform one or more burst data transfers to/from the DAQ device, wherein at least one of the foreground and background iterators is executable to calculate a maximum continuous burst length for the burst data transfer, determine if the burst data transfer having said maximum continuous burst length will overwrite the other iterator, and shorten the burst length if the iterator determines that the burst data transfer having said maximum burst length will overwrite the other iterator.

8. The DAQ system of claim 7, wherein said at least one of the foreground and background iterators is further executable to determine if the burst data transfer having said maximum continuous burst length will wrap around in the buffer;

wherein said at least one of the foreground and background iterators is executable to shorten the burst length if the iterator determines that the burst data transfer having said maximum burst length will wrap around in the buffer.

9. The DAQ system of claim 7, wherein said at least one of the foreground and background iterators is further executable to determine if the burst data transfer includes a non-contiguous break in the burst data transfer;

wherein said at least one of the foreground and background iterators is further executable to shorten the burst length to the end of a contiguous block if the burst data transfer is determined to include a non-contiguous break in the burst data transfer.

10. The DAQ system of claim 1, wherein each of the foreground and background iterators is executable to perform a plurality of burst data transfers to/from the buffer portion of system memory, wherein each of the foreground and background iterators updates a position of the data in the buffer portion of system memory after each burst data transfer.

11. The DAQ system of claim 1, wherein one or more of the foreground iterator and the background iterator comprises a sequence iterator, wherein the sequence iterator is executable to perform non-contiguous data transfers.

12. The DAQ system of claim 1, wherein one or more of the foreground iterator and the background iterator comprises a scaling iterator, wherein the scaling iterator is executable to perform scaling on the data on the fly as data is transferred to/from the buffer object.

13. The DAQ system of claim 1, wherein the background iterator comprises a messaging iterator, wherein the messaging iterator is executable to check for pre-determined conditions in the data, wherein the messaging iterator provides a message to the system if said pre-determined conditions are observed.

14. The DAQ system of claim 1, wherein the background iterator receives a time-out value;
wherein the background iterator is executable to repeatedly perform data transfers during said time-out period;
wherein said background iterator discontinues data transfers when said time-out period has expired.

15. The DAQ system of claim 14, wherein the background iterator examines the buffer portion of system memory to determine if data is available for transfer;
wherein the background iterator enters a sleep mode if the background iterator determines that data is not available for transfer;
wherein the background iterator is awakened from the sleep mode by an event generated by a foreground iterator transferring data to the buffer portion of system memory.

16. The DAQ system of claim 1, wherein the foreground iterator executes in user mode of the CPU;
wherein the background iterator executes in kernel mode of the CPU.

17. The DAQ system of claim 1, further comprising a second computer system; wherein the foreground iterator is stored in a memory of the second computer system and executes in the second computer system; wherein the background iterator is executable to transfer the data to a virtual object on the second computer system.

18. A method for controlling a data acquisition (DAQ) device in a DAQ system, wherein the DAQ system comprises a computer system including a CPU and a system memory, and at least one data acquisition (DAQ) device coupled to the computer system, wherein the data acquisition device is operable to generate/receive data, the method comprising:
a DAQ user application executing in the computer system generating a call to perform data transfer operations in the DAQ system;
creating a buffer object, wherein the buffer object includes data format information specifying a format of the data being transferred
creating a foreground iterator, wherein the foreground iterator is executable to transfer data between a client portion of system memory and a buffer portion of system memory;
creating a background iterator, wherein the background iterator is executable to transfer data between a buffer portion of system memory and the on-board memory comprised on the DAQ device;
the foreground iterator and the background iterator executing in response to the DAQ user application to perform data transfers to/from the DAQ device;
wherein the foreground and background iterators use information in the buffer object to perform the data transfer.

19. The method of claim 18, further comprising:
the background iterator transferring data from the on-board memory comprised on the DAQ device to the buffer portion of system memory; and
the foreground iterator transferring data from the buffer portion of system memory to the client portion of system memory.

20. The method of claim 19, further comprising:
the DAQ device generating an interrupt when the on-board memory on the DAQ device comprises a specified amount of data;
executing an interrupt service routine (ISR) in response to the interrupt;
the ISR invoking the background iterator;
wherein the background iterator transfers data in response to the ISR invoking the background iterator.

21. The method of claim 18, further comprising:
the foreground iterator transferring data from the client portion of system memory to the buffer portion of system memory; and
the background iterator transferring data from the buffer portion of system memory to the on-board memory comprised on the DAQ device.

22. The method of claim 21, further comprising:
the DAQ device generating an interrupt when the on-board memory on the DAQ device is available to receive a specified amount of data;
executing an interrupt service routine (ISR) in response to the interrupt;
the ISR invoking the background iterator;
wherein the background iterator transfers data in response to the ISR invoking the background iterator.

23. The method of claim 18, further comprising:
programming the DAQ device for the transfer.

24. The method of claim 18, further comprising:
the foreground and background iterators executing to perform one or more burst data transfer to/from the DAQ device, wherein, for at least one of the foreground and background iterators, said executing comprises:
the iterator calculating a maximum continuous burst length for the burst data transfer;
the iterator determining if the burst data transfer having said maximum continuous burst length will overwrite the other iterator;
the iterator shortening the burst length if the iterator determines that the burst data transfer having said maximum burst length will overwrite the other iterator.

25. The method of claim 24, wherein said executing further comprises:
the iterator determining if the burst data transfer having said maximum continuous burst length will wrap around in the buffer after said calculating the maximum continuous burst length;

the iterator shortening the burst length if the iterator determines that the burst data transfer having said maximum burst length will wrap around in the buffer.

26. The method of claim 24, wherein said executing further comprises:

the iterator determining if the burst data transfer includes a non-contiguous break in the burst data transfer;

the iterator shortening the burst length to the end of a contiguous block if the iterator determines that the burst data transfer includes a non-contiguous break in the burst data transfer.

27. The method of claim 24, wherein said executing further comprises:

the iterator performing a plurality of burst data transfer to/from the buffer portion;

the iterator updating a position of the data after each burst data transfer.

28. The method of claim 18, wherein one or more of the foreground iterator and the background iterator comprises a sequence iterator, the method further comprising:

the sequence iterator executing to perform non-contiguous data transfers.

29. The method of claim 18, wherein one or more of the foreground iterator and the background iterator comprises a scaling iterator, the method further comprising:

the scaling iterator executing to perform scaling on the data on the fly as data is transferred to/from the buffer object.

30. The method of claim 18, wherein one or more of the foreground iterator and the background iterator comprises a messaging iterator, the method further comprising:

the messaging iterator executing to check for pre-determined conditions in the data, wherein the messaging iterator provides a message to the system if said pre-determined conditions are observed.

31. A buffer object used for buffered data transfers in a data acquisition (DAQ) system, wherein the buffer object is stored in a memory of a computer system comprised in the DAQ system, wherein the DAQ system includes a data acquisition (DAQ) device coupled to the computer system, wherein the data acquisition device is operable to generate/receive data, wherein the DAQ device includes on-board memory;

wherein the buffer object comprises:

data format information regarding a format of data to be transferred;

a foreground iterator stored in the memory of the computer system which is executable to transfer data between a client portion of system memory and a buffer portion of system memory;

a background iterator stored in the system memory of the computer system which is executable to transfer data between the buffer portion of system memory and the on-board memory comprised on the DAQ device;

wherein the foreground iterator and the background iterator execute to perform transfers to/from the DAQ device;

wherein the foreground and background iterators use information in the buffer object to perform the data transfer.

32. The buffer object of claim 31, wherein the background iterator is executable to transfer data from the on-board memory comprised on the DAQ device to the buffer portion of system memory;

wherein the foreground iterator is executable to transfer data from the buffer portion of system memory to the client portion of system memory.

33. The buffer object of claim 31, wherein the foreground iterator is executable to transfer data from the client portion of system memory to the buffer portion of system memory;

wherein the background iterator is executable to transfer data from the buffer portion of system memory to the on-board memory comprised on the DAQ device.

34. The buffer object of claim 31, wherein the buffer object stores data format information regarding a format of the data to be transferred, wherein said data format information comprises information regarding size of data, number of samples per scan, and number of scans of the data.

35. The buffer object of claim 31, wherein the foreground and background iterators are executable to perform one or more burst data transfers to/from the DAQ device, wherein at least one of the foreground and background iterators is executable to calculate a maximum continuous burst length for the burst data transfer, determine if the burst data transfer having said maximum continuous burst length will overwrite the other iterator, and shorten the burst length if the iterator determines that the burst data transfer having said maximum burst length will overwrite the other iterator.

36. The buffer object of claim 35, wherein said at least one of the foreground and background iterators is further executable to determine if the burst data transfer having said maximum continuous burst length will wrap around in the buffer;

wherein said at least one of the foreground and background iterators is executable to shorten the burst length if the iterator determines that the burst data transfer having said maximum burst length will wrap around in the buffer.

37. The buffer object of claim 35, wherein said at least one of the foreground and background iterators is further executable to determine if the burst data transfer includes a non-contiguous break in the burst data transfer;

wherein said at least one of the foreground and background iterators is further executable to shorten the burst length to the end of a contiguous block if the burst data transfer is determined to include a non-contiguous break in the burst data transfer.

38. The buffer object of claim 31, wherein each of the foreground and background iterators is executable to perform a plurality of burst data transfers to/from the buffer portion of system memory, wherein each of the foreground and background iterators updates a position of the data transfer after each burst data transfer.

39. The buffer object of claim 31, wherein one or more of the foreground iterator and the background iterator comprises a sequence iterator, wherein the sequence iterator is executable to perform non-contiguous data transfers.

40. The buffer object of claim 31, wherein one or more of the foreground iterator and the background iterator comprises a scaling iterator, wherein the scaling iterator is executable to perform scaling on the data on the fly as data is transferred to/from the buffer object.

41. A memory media which stores a buffer object for performing buffered transfers in a data acquisition (DAQ) system, wherein the DAQ system comprises a computer system and at least one data acquisition (DAQ) device coupled to the computer system, wherein the data acquisition device is operable to generate/receive data, wherein the buffer object comprises:
  data format information regarding a format of data to be transferred;
  a foreground iterator stored in the memory of the computer system which is executable to transfer data between a client portion of system memory and a buffer portion of system memory;
  a background iterator stored in the system memory of the computer system which is executable to transfer data between the buffer portion of system memory and the on-board memory comprised on the DAQ device;
wherein the foreground iterator and the background iterator execute to perform transfers to/from the DAQ device;
wherein the foreground and background iterators use information in the buffer object to perform the data transfer.

42. The memory media of claim 41,
  wherein the background iterator is executable to transfer data from the on-board memory comprised on the DAQ device to the buffer portion of system memory;
  wherein the foreground iterator is executable to transfer data from the buffer portion of system memory to the client portion of system memory.

43. The memory media of claim 41,
  wherein the foreground iterator is executable to transfer data from the client portion of system memory to the buffer portion of system memory;
  wherein the background iterator is executable to transfer data from the buffer portion of system memory to the on-board memory comprised on the DAQ device.

44. The memory media of claim 41, wherein the buffer object stores data format information regarding a format of the data to be transferred, wherein said data format information comprises information regarding size of data, number of samples per scan, and number of scans of the data.

* * * * *